(12) United States Patent
Yamashita et al.

(10) Patent No.: US 10,697,854 B2
(45) Date of Patent: Jun. 30, 2020

(54) ROLLING BEARING FATIGUE STATE PREDICTION DEVICE AND ROLLING BEARING FATIGUE STATE PREDICTING METHOD

(71) Applicant: Hitachi, Ltd., Chiyoda-ku, Tokyo (JP)

(72) Inventors: Tomoaki Yamashita, Tokyo (JP); Makoto Henmi, Tokyo (JP); Norio Takeda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/302,981

(22) PCT Filed: Apr. 12, 2017

(86) PCT No.: PCT/JP2017/014893
§ 371 (c)(1),
(2) Date: Nov. 19, 2018

(87) PCT Pub. No.: WO2017/203868
PCT Pub. Date: Nov. 30, 2017

(65) Prior Publication Data
US 2019/0204182 A1    Jul. 4, 2019

(30) Foreign Application Priority Data

May 25, 2016   (JP) ................. 2016-104005

(51) Int. Cl.
*G01M 13/00*   (2019.01)
*G01M 13/04*   (2019.01)
(Continued)

(52) U.S. Cl.
CPC ............. *G01M 13/04* (2013.01); *F16C 19/06* (2013.01); *F16C 19/522* (2013.01); *F16C 41/00* (2013.01); *F16C 2233/00* (2013.01)

(58) Field of Classification Search
CPC ....... G01M 13/04; F16C 19/06; F16C 19/522; F16C 41/00; F16C 2233/00
(Continued)

(56) References Cited

U.S. PATENT DOCUMENTS

| 5,952,587 A | * | 9/1999 | Rhodes | ................. F16C 19/364 |
| | | | | 73/862.541 |
| 7,006,953 B2 | * | 2/2006 | Takemura | ............... F16C 19/00 |
| | | | | 703/2 |

(Continued)

FOREIGN PATENT DOCUMENTS

| JP | 2004-239746 A | 8/2004 |
| JP | 2006-77945 A | 3/2006 |

(Continued)

OTHER PUBLICATIONS

International Search Report (PCT/ISA/210) issued in PCT Application No. PCT/JP2017/014893 dated Jul. 18, 2017 with English translation (four (4) pages).

(Continued)

*Primary Examiner* — Max H Noori
(74) *Attorney, Agent, or Firm* — Crowell & Moring LLP

(57) ABSTRACT

There are provided a rolling bearing fatigue state prediction device and a rolling bearing fatigue state prediction method capable of highly accurately predicting a fatigue state of a rolling bearing even when a direction of a load applied to a rolling bearing changes. A rolling bearing fatigue state prediction device includes a load measurement unit for determining a magnitude and a direction of a bearing load applied to a rolling bearing supporting a rotating body, a load applied region identification unit for identifying a region to which a load is applied in a circumferential region of the rolling bearing, and a fatigue state prediction unit for predicting a fatigue state of the rolling bearing based on the (Continued)

obtained magnitude of the load and the identified load applied region.

14 Claims, 17 Drawing Sheets

(51) Int. Cl.
    *F16C 41/00*     (2006.01)
    *F16C 19/06*     (2006.01)
    *F16C 19/52*     (2006.01)

(58) Field of Classification Search
    USPC .......................................................... 73/788
    See application file for complete search history.

(56) References Cited

U.S. PATENT DOCUMENTS

| | | | |
|---|---|---|---|
| 7,305,330 B2 * | 12/2007 | Urakami | F16C 19/00 703/2 |
| 8,978,424 B2 * | 3/2015 | Niarfeix | G01B 7/22 324/207.11 |
| 2002/0057856 A1 * | 5/2002 | Bailey | F16C 19/364 384/448 |
| 2006/0144164 A1 | 7/2006 | Pecher et al. | |
| 2007/0143039 A1 * | 6/2007 | Mol | G01L 5/0009 702/41 |
| 2007/0277613 A1 | 12/2007 | Iwatsubo et al. | |
| 2008/0091361 A1 * | 4/2008 | Pecher | G01L 5/0019 702/41 |
| 2008/0317396 A1 * | 12/2008 | Pecher | G01P 13/00 384/448 |
| 2014/0157880 A1 | 6/2014 | Matsuda | |

FOREIGN PATENT DOCUMENTS

| | | |
|---|---|---|
| JP | 2006-520464 A | 9/2006 |
| JP | 4504065 B2 | 7/2010 |
| JP | 2011-52984 A | 3/2011 |
| JP | 2014-114934 A | 6/2014 |
| JP | 2014-240811 A | 12/2014 |

OTHER PUBLICATIONS

Japanese-language Written Opinion (PCT/ISA/237) issued in PCT Application No. PCT/JP2017/014893 dated Jul. 18, 2017 (five (5) pages).

* cited by examiner

→ ROTATING DIRECTION
IN THE CASE OF ROTATION ON INNER RING SIDE

⇢ ROTATING DIRECTION
IN THE CASE OF ROTATION ON OUTER RING SIDE

ROLLING BEARING FATIGUE STATE PREDICTION DEVICE AND ROLLING BEARING FATIGUE STATE PREDICTING METHOD

TECHNICAL FIELD

The present invention relates to a device for measuring a state of a rolling bearing supporting a rotating body, and more particularly to a rolling bearing fatigue state prediction device and a rolling bearing fatigue state prediction method for predicting a fatigue state of a rolling bearing.

BACKGROUND ART

Predicting a life of a rolling bearing is important in selecting the type of the bearing and optimizing a bearing replacement timing. However, because of the complexity of rolling contact characteristics and a large number of parts related to fatigue, even if the same type of bearing is used under the same condition, the life of the rolling bearing is largely varied. Therefore, a method in which Weibull distribution is applied to a bearing life distribution state, and a value representative of the distribution is used has been proposed, and the method is still in use. In addition, the most frequently used life of the bearing is a basic rated life $L_{10}$ represented by the following Expression (1) as a life in which 10% of the total number of bearings are damaged.

[Ex. 1]

$$L_{10} = \left(\frac{C}{P}\right)^p \quad (1)$$

In this example, C is called a basic dynamic load rating and is a parameter indicating a dynamic load capacity of the bearing. In addition, P is an equivalent load to be applied to the bearing. An index p is 3 for ball bearings and 10/3 for roller bearings.

The basic rated life $L_0$ has been used for a long period of time, but thereafter it becomes clear that the life of the bearing is affected by a fatigue limit load of the bearing, a lubrication condition, an operating environment, contaminated particles (iron powder or dust mixed in a lubricant) during operation, and a cleanliness at the time of installation. A correction factor $a_{iso}$ considering those influences has been proposed on the basis of a large number of test results, and a modified rated life $L_{nm}$ represented by the following Expression (2), which is obtained by multiplying $L_{10}$ by a coefficient $a_1$ for calculation of the correction factor and any damage probability n %, has been proposed.

[Ex. 2]

$$L_{nm} = a_1 a_{iso} \left(\frac{C}{P}\right)^p \quad (2)$$

In recent years, there has been a growing demand for optimizing the replacement timing of the rolling bearing to maximize product availability. As a method of meeting the demand, for example, Patent Literature 1 or Patent Literature 2 discloses a method of measuring a physical quantity relating to the rolling bearing at the time of actual operation and evaluating the fatigue state of the rolling bearing that changes from moment to moment, and a method of measuring a load at the time of actual operation, which is further required.

Patent Literature 1 discloses a tapered roller bearing having strain gauges which are spaced apart from each other in an axial direction, and disposed on a circumferential surface of an outer circumferential surface of the tapered roller on a sixed fixed to an inner circumferential surface of an outer ring, a substrate that is disposed along an axial direction at the center of the tapered roller, and a processing unit that is mounted on the substrate, and configured to measure the load applied to the tapered roller bearing.

In addition, Patent Literature 2 discloses a technique of storing basic data obtained by measuring a state of a diagnostic rolling bearing in advance, measuring a load to be applied to the bearing, which is measured by an acceleration sensor, detecting a deterioration state of a lubricant having a large influence on a life of the diagnostic rolling bearing based on a measured value and basic data, and evaluating a remaining life of the rolling bearing on-line on the basis of the detected result.

CITATION LIST

Patent Literature

Patent Literature 1: Japanese Unexamined Patent Application Publication No. 2014-114934
Patent Literature 2: Japanese Patent No. 4504065

SUMMARY OF INVENTION

Technical Problem

By the way, at the time of actual operation, a direction as well as a magnitude of the load applied to the rolling bearing is not necessarily kept constant. For example, in a spindle bearing that supports a spindle of a wind power generator, the direction of the load acting on the spindle bearing changes due to the sharing of the wind load acting on multiple blades. When the direction of the load applied to the rolling bearing changes, a region to which the load is applied changes in an inner ring or an outer ring of the rolling bearing.

However, neither Patent Literature 1 nor Patent Literature 2 takes into consideration any point that the direction of the load applied to the bearing changes. For that reason, when the life of the rolling bearing used under a condition in which the direction of the bearing load is not kept constant is predicted, there is a possibility that a prediction accuracy is lowered.

In view of the above, the present invention aims at providing a rolling bearing fatigue state prediction device and a rolling bearing fatigue state prediction method which are capable of predicting a fatigue state of a rolling bearing with high accuracy even when a direction of a load applied to the rolling bearing changes.

Solution to Problem

In order to solve the above problem, according to the present invention, there is provided a rolling bearing fatigue state prediction device, including: a load measurement unit that obtains a magnitude and a direction of a bearing load to be applied to a rolling bearing that supports a rotating body; a load applied region identification unit that identifies a region to which the load is applied in a circumferential region of the rolling bearing; and a fatigue state prediction unit that predicts a fatigue state of the rolling bearing based on the obtained magnitude of the load and the identified load applied region.

In addition, according to the present invention, there is provided a rolling bearing fatigue state prediction method for predicting a fatigue state of a rolling bearing which supports a rotating body, including: obtaining a magnitude and a direction of a bearing load to be applied to the rolling bearing; identifying a region to which the load is applied in a circumferential region of the rolling bearing based on the obtained magnitude and direction of the bearing load; and predicting a fatigue state of the rolling bearing based on the obtained magnitude of the load and the identified load applied region.

Advantageous Effects of Invention

According to the present invention, there can be provided a rolling bearing fatigue state prediction device and a rolling bearing fatigue state prediction method which are capable of predicting a fatigue state of a rolling bearing with high accuracy even when a direction of a load applied to the rolling bearing changes.

The problems, configurations, and effects other than those described above will be clarified from a description of embodiments below.

DESCRIPTION OF EMBODIMENTS

In the present specification, a term "rolling bearing" includes a rolling ball bearing that includes a cylindrical inner ring disposed so as to cover an outer circumferential surface of a rotating shaft, a cylindrical outer ring covering an outer circumferential surface of the cylindrical inner race, having a predetermined interval radially outward from the outer circumferential surface of the inner race, and a bearing housing disposed so as to cover the outer circumferential surface of the outer ring in which multiple spherical balls are disposed between the outer circumferential surface of the inner ring and the inner circumferential surface of the outer ring as rolling elements in the circumferential direction, and a rolling roller bearing in which multiple cylindrical rollers are disposed between the outer circumferential surface of the inner ring and the inner circumferential surface of the outer ring as rolling elements in the circumferential direction.

Further, the "rolling bearing" includes a deep groove bearing in which multiple arcuate deep grooves are provided at a predetermined interval in the circumferential direction in the outer circumferential surface of the cylindrical inner ring and arcuate deep grooves are provided in the inner circumferential surface of the cylindrical outer ring at positions facing the deep grooves provided in the outer circumferential surface of the inner ring.

Further, in the present specification, a rotating machine having a rolling bearing which rotatably supports a rotating shaft and changing a direction of a load acting on the rolling bearing includes, for example, a wind power generator or a construction machine used in a drilling site or a construction site.

Hereinafter, embodiments of the present invention will be described with reference to the drawings.

First Embodiment

Figure 1:
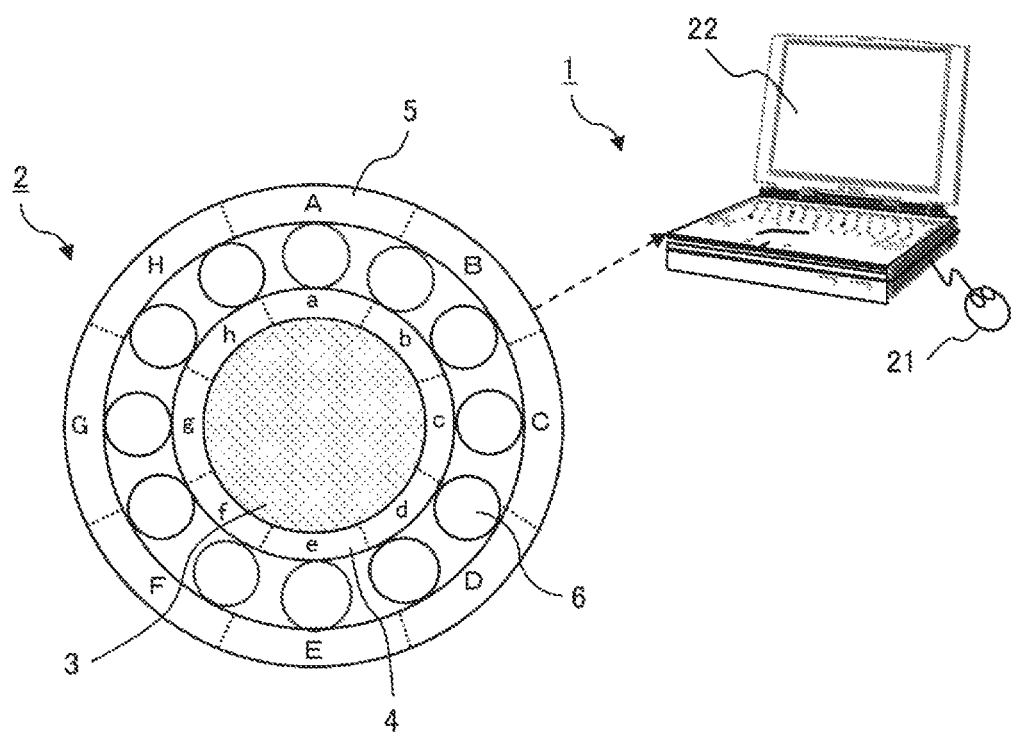
FIG. 1 is an overall schematic configuration diagram of a rolling bearing fatigue state prediction device according to a first embodiment of the present invention.
Figure 2:
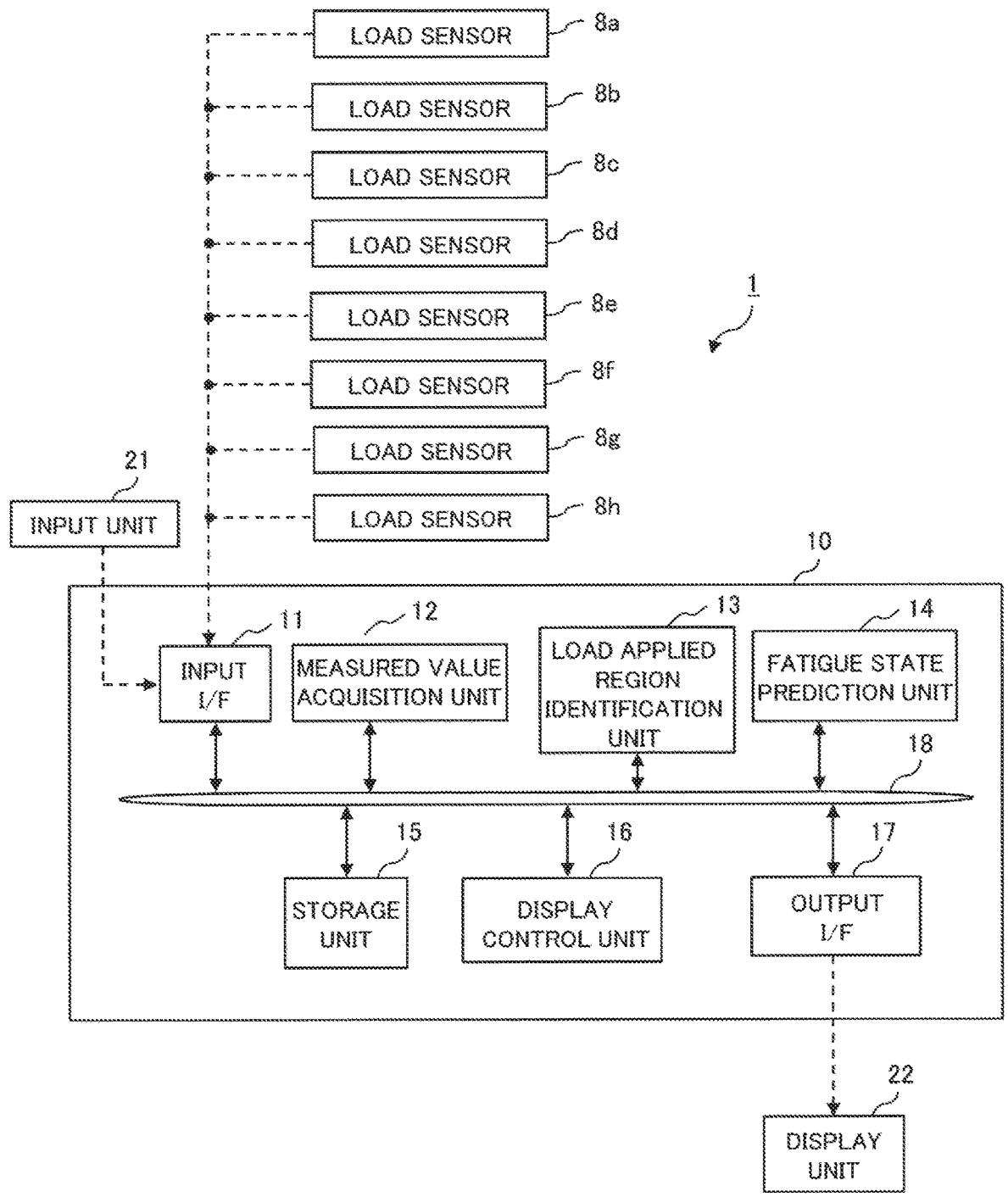
FIG. 2 is a functional block diagram of the rolling bearing fatigue state prediction device shown in FIG. 1.

FIG. 1 is an overall schematic configuration diagram of a rolling bearing fatigue state prediction device according to a first embodiment which is one embodiment of the present invention and FIG. 2 is a functional block diagram of the rolling bearing fatigue state prediction device shown in FIG. 1.

As shown in FIG. 1, a rolling bearing fatigue state prediction device 1 includes at least an input unit 21 and a display unit 22, and has an arithmetic unit that predicts a fatigue state of a rolling bearing 2 based on measurement data (measurement signal) from a load sensor which will be described in detail later. As shown in FIG. 1, the rolling bearing 2 is disposed so as to cover an outer circumferential surface of a rotating shaft 3, and includes a cylindrical inner ring 4 which is fitted to the rotating shaft 3, a cylindrical outer ring 5 which covers an outer circumferential surface of the cylindrical inner ring 4, is spaced apart from the outer circumferential surface of the inner ring 4 at a predetermined interval radially outward, and is disposed concentrically with the inner ring 4, and multiple rolling elements 6 that are disposed between the outer circumferential surface of the inner ring 4 and the inner circumferential surface of the outer ring 5 so as to be spaced apart from each other at predetermined intervals in the circumferential direction. A bearing housing that covers the outer circumferential surface of the outer ring 5 is omitted in FIG. 1.

In addition, as shown in FIG. 1, as an example, the inner ring 4 is labeled in advance with eight divided regions, that is, regions a to h along the circumferential direction of the inner ring 4. Likewise, the outer ring 5 is labeled in advance in eight divided regions including regions A to H along the circumferential direction of the outer ring 5.

As shown in FIG. 2, the rolling bearing fatigue state prediction device 1 according to the present embodiment includes load sensors 8a to 8h, an arithmetic unit 10, an input unit 21 such as a keyboard and a mouse, and a display unit 22 such as an LCD or an organic EL.

The arithmetic unit 10 includes an input I/F 11, a measured value acquisition unit 12, a load applied region identification unit 13, a fatigue state prediction unit 14, a storage unit 15, a display control unit 16, and an output I/F 17, which are connected to each other through an internal bus 18. The input I/F 11 receives measured values measured by the load sensors 8a to 8h and also receives setting information (a lubrication condition, a filter condition, and so on) from an operator through an input unit 21. The measured value acquisition unit 12 obtains the measured values through the input I/F 11. The load applied region identification unit 13 identifies which one of the region a to the region h, which are divided regions of the inner ring 4 of the rolling bearing 2, or the region A to the region H, which are divided regions of the outer ring 5, has been applied with the load. The fatigue state prediction unit 14 predicts the fatigue state of the rolling bearing 2 based on the measured value from the measured value acquisition unit and the load applied region identified by the load applied region identification unit 13. The load applied region identification unit 13, the fatigue state prediction unit 14, and the display control unit 16 are realized by, for example, storage devices such as a ROM that stores various programs and a RAM that temporarily stores data during an operation process or a program execution process, and a processor such as a CPU that executes the various programs stored in the ROM.

The measured value acquisition unit 12 performs smoothing processing such as A/D conversion and noise removal on the bearing load measurement data which is the measured value measured by the load sensors 8a to 8h, and transfers the smoothed bearing load measurement data to the load applied region identification unit 13 through the internal bus 18 while storing the smoothed bearing load measurement data in a predetermined storage area of the storage unit 15. In addition, the measured value acquisition unit 12 converts a measured rotational speed from, for example, an encoder or the like (not shown) into rotational speed data, and transfers the converted rotational speed data to the load applied region identification unit 13 through the internal bus 18 while storing the converted rotational speed data in the predetermined storage area of the storage unit 15.

Further, the storage unit 15 stores coordinate values of the regions a to h which are the divided regions of the inner ring 4 labeled and the regions A to H which are the divided regions of the outer ring 5, for example, as coordinate values of boundaries with adjacent other divided regions at both ends in the circumferential direction in a cylindrical coordinate system. The storage unit 15 stores the bearing load measurement data that has been subjected to the smoothing processing such as the A/D conversion and the noise removal described above in a predetermined storage area. Further, the storage unit 15 stores a lubrication condition, a filter condition, and the like, which are setting information input in advance by the operator through the input unit 21, in a predetermined storage area.

The load applied region identification unit 13 identifies which one of the regions a to h, which are the divided regions of the inner ring 3 of the rolling bearing 2, or the regions A to H, which are the divided regions of the outer ring 5, has been applied with the load, based on the bearing load measurement data that has been subjected to the smoothing processing such as the A/D conversion and the noise removal, from the measured value acquisition unit 12, which is input through the internal bus 18. The load applied region identification unit 13 transfers the identified load applied region to the fatigue state prediction unit 14 through the internal bus 18 and also stores the identified load applied region in a predetermined storage region of the storage unit 15.

The fatigue state prediction unit 14 predicts the fatigue state of the rolling bearing 2 based on the load applied region identified by the load applied region identification unit 13, which is input through the internal bus 18, the bearing load measurement data that has been subjected to the smoothing processing such as the A/D conversion and noise removal, which is input from the measured value acquisition unit 12 or the bearing load measurement data that has been subjected to the smoothing processing such as the A/D conversion and the noise removal, which is stored in the storage unit 15. In this case, the fatigue state includes, for example, any one or any combination of a remaining life of the rolling bearing 2, a cumulative damage degree, a damage probability, and a risk represented by an index obtained by multiplying the damage probability by the degree of influence on the device in the case where the damage occurs. Incidentally, "the degree of influence" means, for example, the cost required for parts replacement, and a cost loss (damage amount) caused by stopping a rotating machine having the rolling bearing for parts replacement. The fatigue state prediction result of the rolling bearing 2 obtained by the fatigue state prediction unit 14 is displayed on a screen of the display unit 22 through the display control unit 16 and the output I/F 17.

Next, the load sensors 8a to 8h installed in the rolling bearing 2 will be described.

Figure 3:
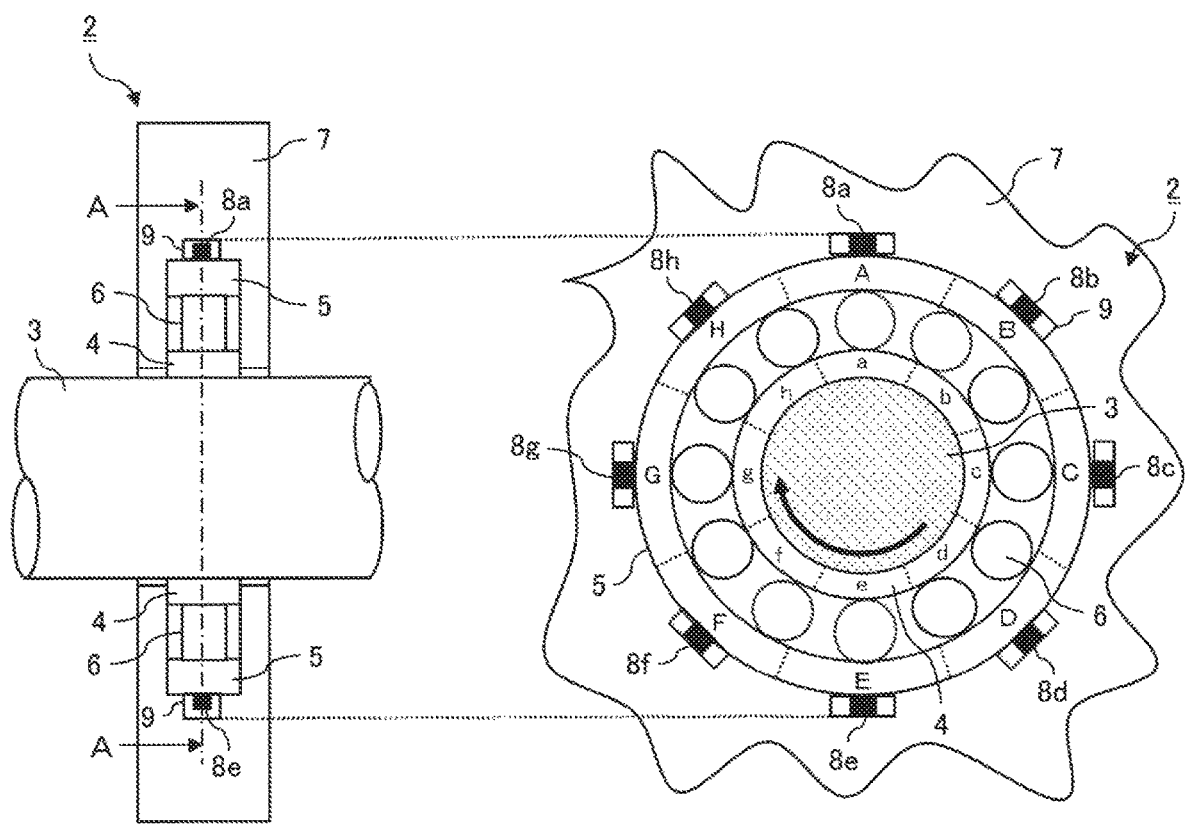
FIG. 3 is a longitudinal sectional view taken along a plane parallel to a longitudinal direction of a rotating shaft of a rolling bearing and a view taken along an arrow A-A.

FIG. 3 is a longitudinal sectional view of the rolling bearing taken along a plane parallel to a longitudinal direction of the rotating shaft and a view taken along an arrow A-A, which shows a case in which the inner ring 4 rotates together with the rotating shaft 3. A case in which a cylindrical roller is used as the rolling element 6 will be described below as an example. As shown in a left illustration of FIG. 3, the rolling bearing 2 includes the inner ring 4 fitted to the outer circumferential surface of the rotating shaft 3, the outer ring 45, the multiple rolling elements 6 disposed between the inner ring 4 and the outer ring 5, and a bearing housing 7 arranged radially outward of the outer ring 5. The inner circumferential surface of the bearing housing 7 is fitted to the outer circumferential surface of the outer ring 5.

As shown in a right illustration of FIG. 3, which is a cross-sectional view taken along an arrow A-A, concave portions 9 recessed radially outward are provided on the inner circumferential surface of the bearing housing 7, which is a fixed side, at positions facing the central portions of the respective divided regions of the outer ring 5 similarly on the fixed side, that is, the region A, the region B, the region C, the region D, the region E, the region F, the region G, and the region H. In the concave portions 9, the load sensor 8a is installed so as to face the region A, the load sensor 8b is installed so as to face the region B, the load sensor 8c is installed so as to face the region C, and the load sensor 8d is installed so as to face the region D. In addition, the load sensor 8e is installed so as to face the region E, the load sensor 8f is installed so as to face the region F, the load sensor 8g is installed so as to face the region G, and the load sensor 8h is installed so as to face the region H.

The load sensors 8a to 8h are disposed at intervals of 45° in the circumferential direction in respective concave portions 9 provided on the inner circumferential surface of the bearing housing 7. In other words, an example in which the load sensors are disposed at eight places is illustrated. The number of load sensors disposed in the circumferential direction is not limited to the above number. For example, the load sensors may be disposed at two places orthogonal to each other with respect to an axial center of the rotating shaft 3, and in that case, a synthetic vector is obtained on the basis of the bearing load measurement data measured by the two load sensors orthogonally disposed, thereby being capable of determining which region among the respective divided regions A to H of the outer ring 5 has been applied with the load. In addition, eight or more load sensors may be disposed in the circumferential direction, and in that case, the divided regions are set for the inner ring 4 and the outer ring 5 corresponding to the number of load sensors. In this way, the number of load sensors disposed in the circumferential direction may be appropriately set.

The load sensor is configured by, for example, a load cell, a strain sensor, a strain gauge, or the like. The bearing load measurement data measured by the load sensors 8a to 8h can be wired or wirelessly transmitted to the input I/F 11 configuring the arithmetic unit 10. Since the multiple load sensors 8a to 8h are installed in the circumferential direction of the outer ring 5, a magnitude $F_P(t)$ of the load applied to the rolling bearing 2 at a time t (t) and a load direction $\theta$ (t) are obtained.

Figure 4:
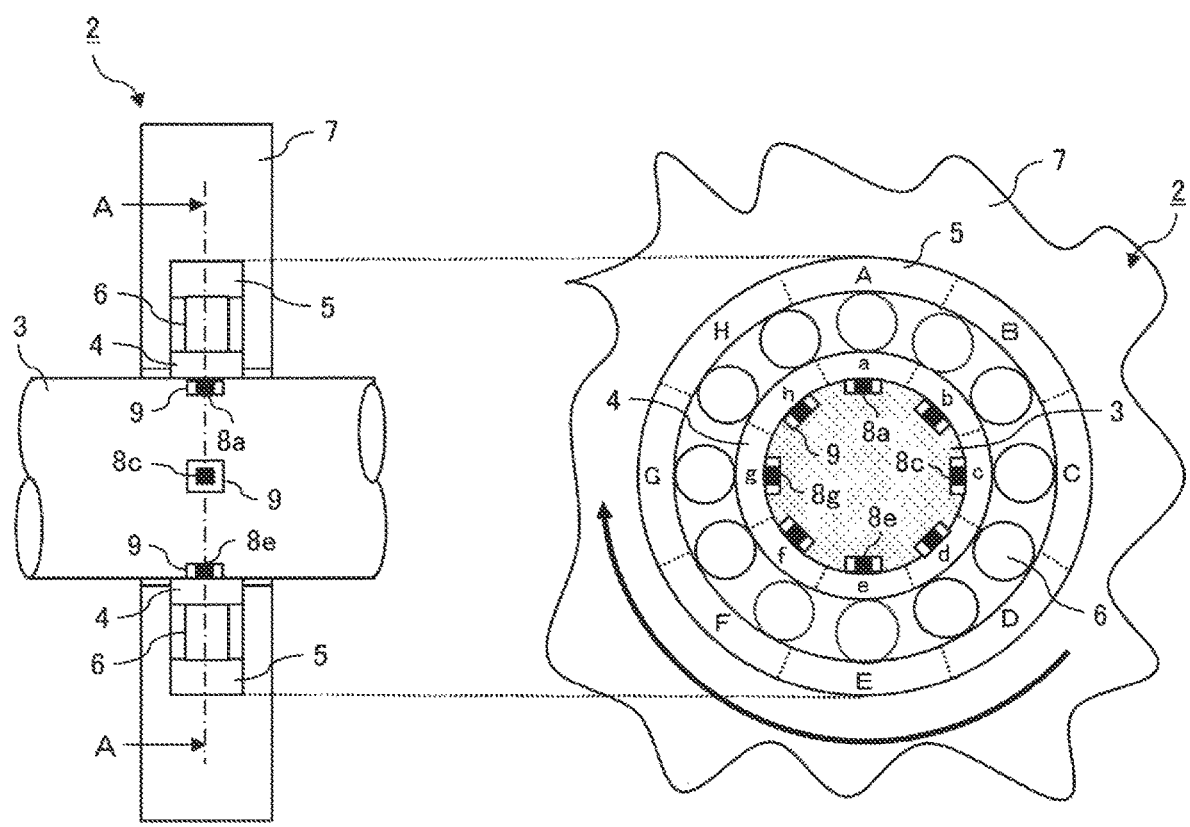
FIG. 4 is a longitudinal sectional view taken along the plane parallel to the longitudinal direction of the rotating shaft of the rolling bearing and a view taken along an arrow A-A.

FIG. 4 is a longitudinal sectional view taken along a plane parallel to the longitudinal direction of the rotating shaft of the rolling bearing and a view taken along an arrow A-A of the rolling bearing, which shows a case of the rolling bearing in which the outer ring 5 rotates together with the bearing housing 7. As shown in a left illustration of FIG. 4 and a right illustration which is a cross-sectional view taken along an arrow A-A, concave portions 9 recessed radially inward are provided on the outer circumferential surface of the rotating shaft 3, which is a fixed side, at positions facing the central portions of the respective divided regions of the inner ring 4 similarly on the fixed side, that is, the region a, the region b, the region c, the region d, the region e, the region f, the region g, and the region h. In the concave portions 9, the load sensor 8a is installed so as to face the region a, the load sensor 8b is installed so as to face the region b, the load sensor 8c is installed so as to face the region c, and the load sensor 8d is installed so as to face the region d. In addition, the load sensor 8e is installed so as to face the region e, the load sensor 8f is installed so as to face the region f, the load sensor 8g is installed so as to face the region g, and the load sensor 8h is installed so as to face the region h.

The load sensors 8a to 8h are disposed at intervals of 45° in the circumferential direction in the respective concave portions 9 provided on the outer circumferential surface of the rotating shaft 3. In other words, an example in which the load sensors are disposed at eight places is illustrated. The number of load sensors disposed in the circumferential direction is not limited to the above number. For example, the load sensors may be disposed at two places orthogonal to each other with respect to the axial center of the rotating shaft 3, and in that case, a composite vector is obtained on the basis of the bearing load measurement data measured by the two load sensors disposed orthogonally to each other, thereby being capable of determining which region among the respective divided regions a to h of the inner ring 4 the load has been applied with the load. Furthermore, eight or more load sensors may be disposed in the circumferential direction. In that case, divided regions are set for the inner ring 4 and the outer ring 5 corresponding to the number of the load sensors. In this way, the number of load sensors disposed in the circumferential direction may be appropriately set.

The bearing load measurement data measured by the load sensors 8a to 8h are input to the input I/F 11 (FIG. 2) configuring the arithmetic unit 10 by wire or wireless. Since the multiple load sensors 8a to 8h are installed in the circumferential direction of the inner ring 4, the magnitude $F_P(t)$ and the load direction $\theta$ (t) of the load applied to the rolling bearing 2 at the time t are obtained.

Figure 5:
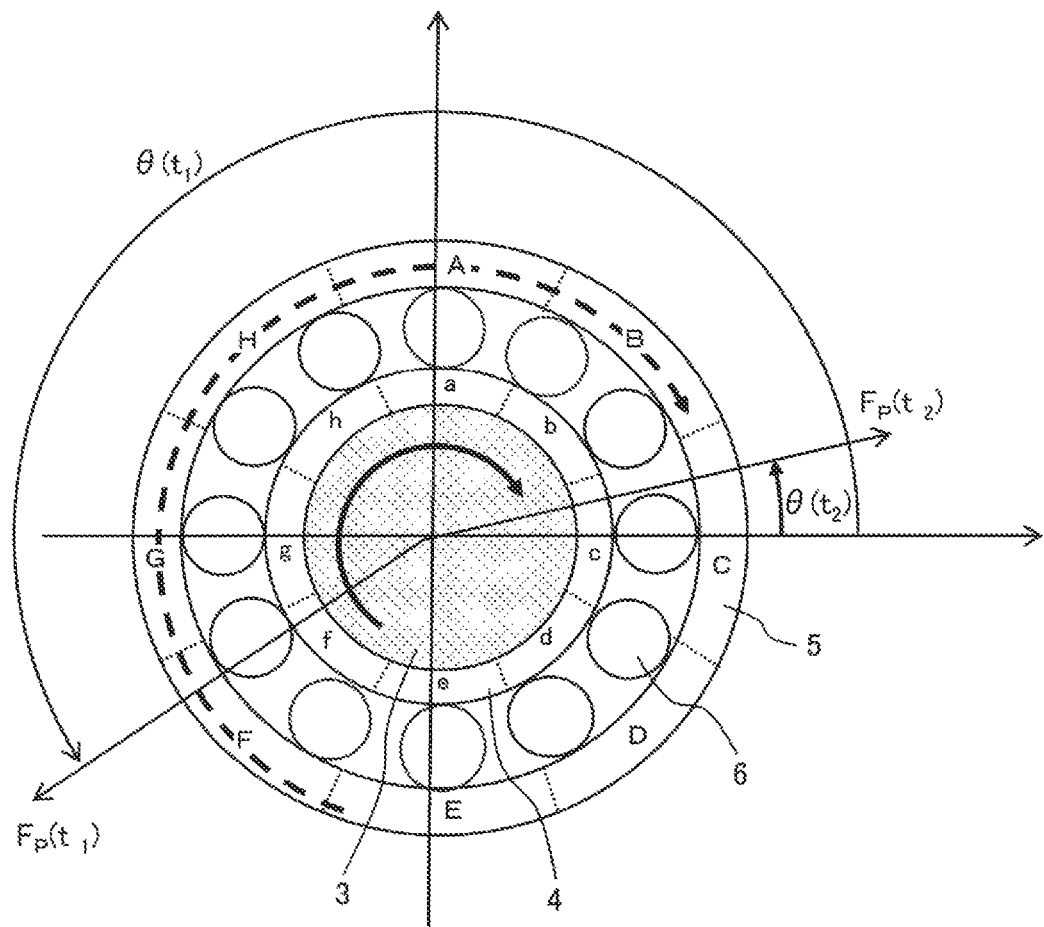
FIG. 5 is a transverse sectional view of the rolling bearing, which is an illustrative view for identifying a region to which a load is applied by a load applied region identification unit shown in FIG. 2.

Next, a description will be given of identification of the region to which the load is applied by the load applied region identification unit 13 configuring the arithmetic unit 10. FIG. 5 is a transverse sectional view of the rolling bearing 2, which is an illustrative diagram for identifying the region to which the load is applied by the load applied region identification unit 13 shown in FIG. 2. Referring to FIG. 5, a thick solid line arrow indicates a rotational direction in the case of rotation on the inner ring side, and a thick dotted line arrow indicates a rotational direction in the case of rotation on the outer ring side.

As shown in FIG. 5, the inner ring 4 is labeled in advance with eight divided regions along the circumferential direction, that is, with the regions a to h, and similarly the outer ring 5 is labeled in advance with eight divided regions along the circumferential direction, that is, with the regions A to H. In the case of the rotation on the inner ring side, a time change $F_P(t)$ of the load applied to the rolling bearing 2 at discrete positions (the region A to the region H) along the circumferential direction of the outer ring 5, which is the fixed side, is measured by the load sensors 8a to 8h shown in FIG. 3. In an example shown in FIG. 5, at a time $t_1$, since a magnitude of the load applied to the rolling bearing 2 is $F_P(t_1)$ and a direction of the load is $\theta(t_1)$, the load applied region identification unit 13 identifies that the load is applied to the region F among the divided regions labeled on the outer ring 5, that is, the regions A to H. In other words, the load applied region identification unit 13 identifies the region F as the load applied region at the time t1. Also, at a time $t_2$, since the magnitude of the load applied to the rolling bearing 2 is $F_P(t_2)$ and the direction of the load is $\theta(t_2)$, the load applied region identification unit 13 identifies that the load has been applied to the region C among the divided regions labeled on the outer ring 5, that is, the regions A to H. In other words, the load applied region identification unit 13 identifies the region C as the load applied region at the time $t_2$.

In the case of the rotation on the outer ring side, the time change $F_P(t)$ of the load at the discrete positions (the region a to the region h) in the circumferential direction of the inner ring 4 is measured by the load sensors 8a to 8h shown in FIG. 4. In the example shown in FIG. 5, at the time $t_1$, since the magnitude of the load applied to the rolling bearing 2 is $F_P(t)$ and the direction of the load is $\theta(t_1)$, the load applied region identification unit 13 identifies that the load is applied to the region f among the divided regions labeled on the inner ring 4, that is, the regions a to h. In other words, the load applied region identification unit 13 identifies the region f as the load applied region at the time $t_1$. Also, at the time $t_2$, since the magnitude of the load applied to the rolling bearing 2 is $F_P(t_2)$ and the direction of the load is $\theta(t_2)$, the load applied region identification unit 13 identifies that the load has been applied to the region c among the divided regions labeled on the inner ring 4, that is, the regions a to h. In other words, the load applied region identification unit 13 identifies the region c as the load applied region at the time $t_2$.

In this example, the reason that the load applied region identification unit 13 identifies the region of the load applied to the rolling bearing 2 as the fixed side is because the rotational speed is generally sufficiently higher than a rate at which the direction of the load changes, and therefore all the divided regions on the rotating side pass through the direction $\theta(t)$ of the load while the rotating side makes one rotation. For that reason, only a variation in the magnitude of the load has only to be found with respect to the rotating side. As a result, the magnitude Fp(t) of the bearing load for each divided region is obtained.

Figure 6:
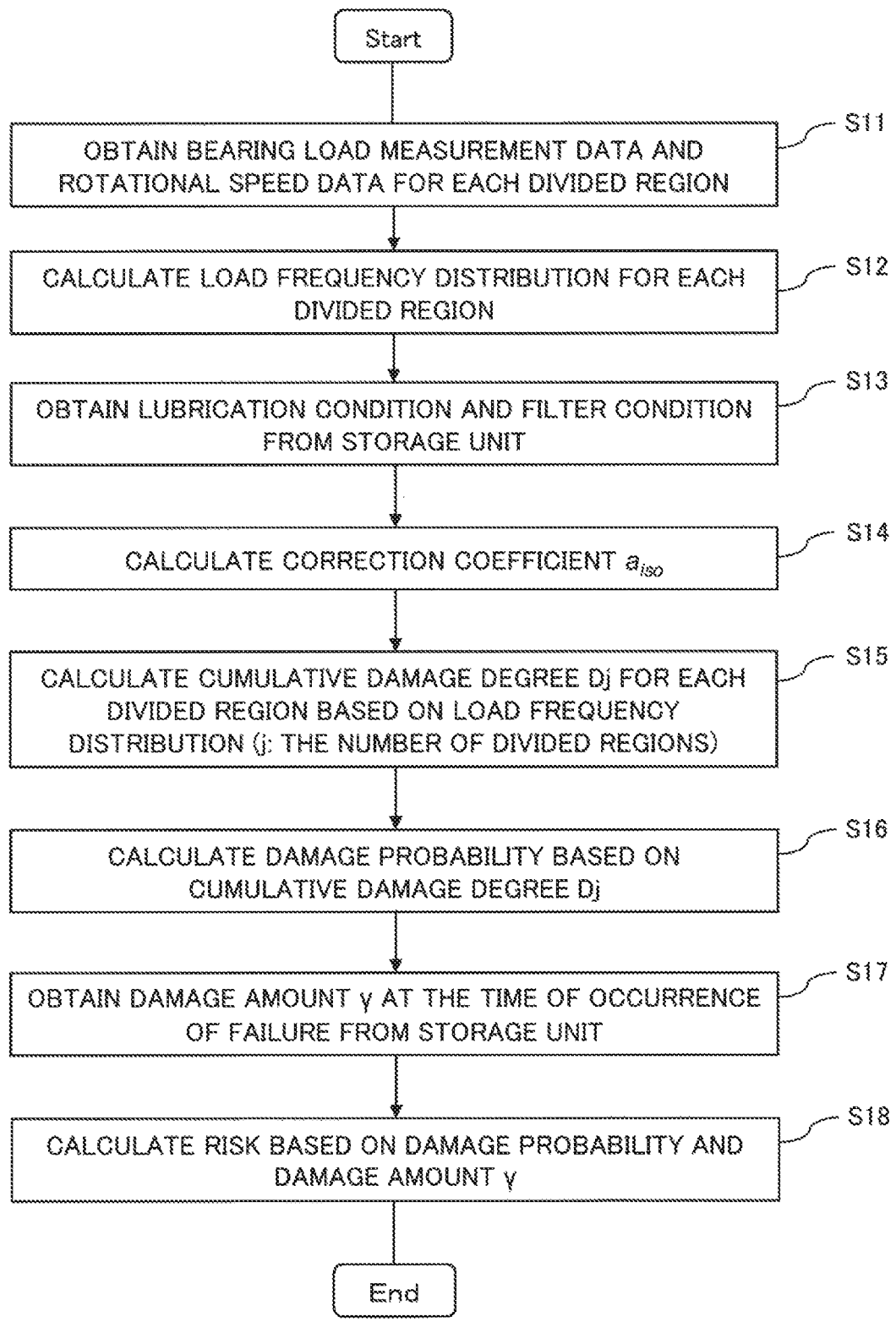
FIG. 6 is a flowchart of the entire processing of the rolling bearing fatigue state prediction device.
Figure 7:
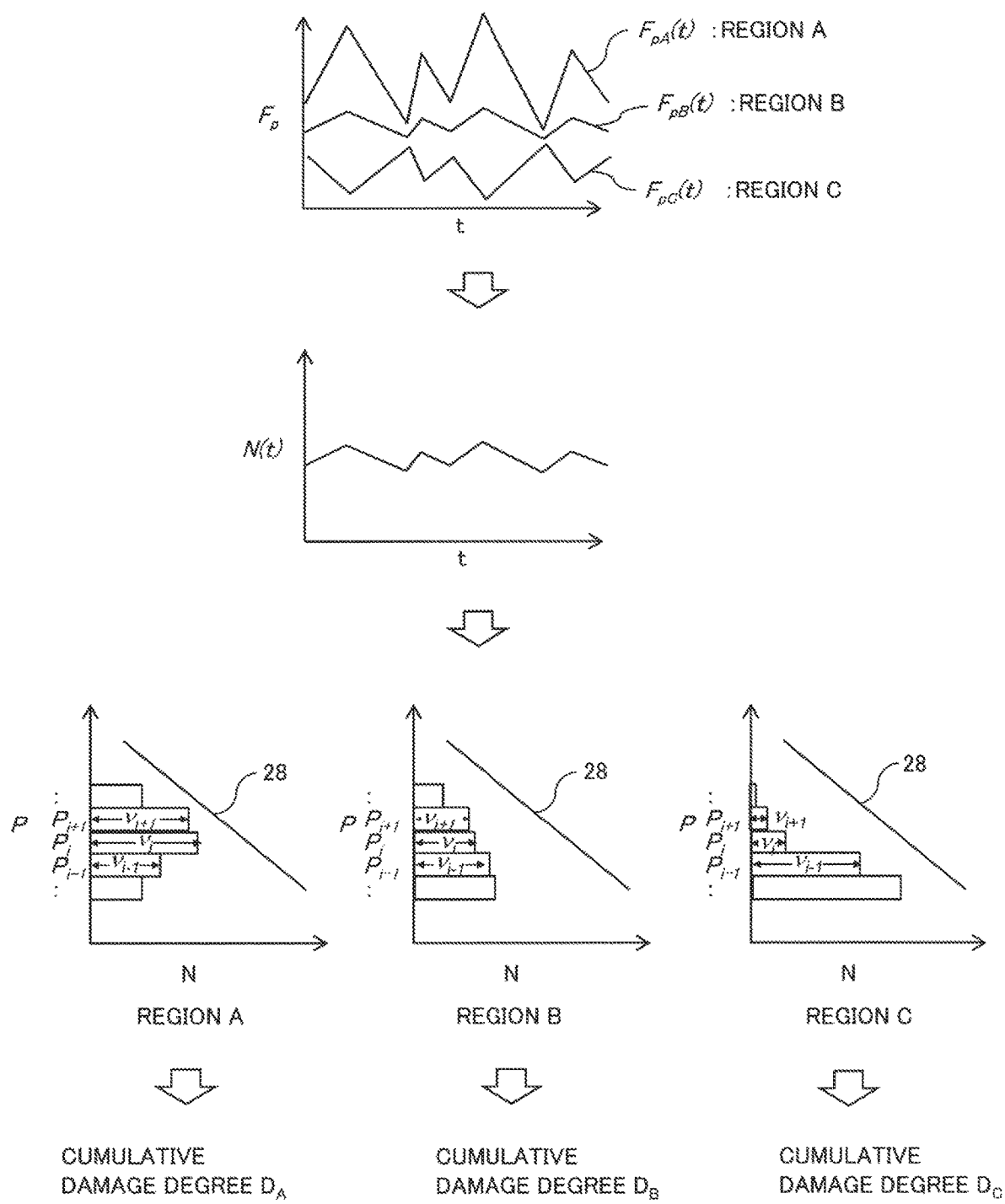
FIG. 7 is a schematic illustrative diagram for obtaining a cumulative damage degree from a load frequency analysis by the rolling bearing fatigue state prediction device.

Next, a processing flow of the rolling bearing fatigue state prediction device 1 will be described. FIG. 6 is a flowchart of the entire process of the rolling bearing fatigue state prediction device 1. FIG. 7 is a schematic illustrative diagram for obtaining a cumulative damage degree from a load frequency analysis by the rolling bearing fatigue state prediction device 1. Hereinafter, an example in which the inner ring 4 shown in FIG. 3 rotates together with the rotating shaft 3 (in the case of rotation on the inner ring side in FIG. 5) will be described. Hence, the bearing load measurement data measured by the respective load sensors 8a to 8h correspond to the respective divided regions of the outer ring 5 on the fixed side, that is, the regions A to H.

As shown in FIG. 6, in Step S11, the load applied region identification unit 13 obtains the bearing load measurement data (magnitude Fp(f) of the load, the direction $\theta(t)$ of the load) and the rotational speed data (N(t)) by the measured value acquisition unit 12 for each of the divided regions (region A to region H) through the internal bus 18. In this situation, as shown in FIG. 5 described above, the load applied region identification unit 13 identifies the region to which the load is applied among the divided regions divided along the circumferential direction of the rolling bearing 2, based on the obtained bearing load measurement data (magnitude Fp(t) of the load, the direction $\theta(t)$ of the load). Now, refer to FIG. 7. In FIG. 7, for the sake of convenience of description (from the viewpoint of ease of view), only the regions A to C among the respective divided regions of the outer ring 5 on the fixed side, that is, the regions A to H are illustrated as an example. As shown in an uppermost illustration of FIG. 7, the bearing load measurement data of each divided region (region A to region C) obtained from the measured value acquisition unit 12 is obtained as a time function of $F_{PA}(t)$ for the region A, as a time function of $F_{PB}(t)$ for the region B, and as a time function of $F_{PC}(t)$ for the region C by taking the time t on a horizontal axis and the bearing load measurement data $F_P$ on a vertical axis. As shown in a lower illustration of FIG. 7, a rotational speed data (N (t)) obtained from the measured value acquisition unit 12 is obtained as a time function of the rotational speed by taking the time t on the horizontal axis and the rotational speed data N(t) on the vertical axis.

Returning to FIG. 6, in Step S12, the fatigue state prediction unit 14 obtains the bearing load measurement data (the magnitude Fp(t) of the load, the direction $\theta(t)$ of the load) for each of the divided regions (the regions A to H) from the measured value acquisition unit 12 through the internal bus 18) and the rotational speed data (N(t)), and also obtains the load applied region identified through the internal bus 18 from the load applied region identification unit 13. The fatigue state estimating unit 14 calculates the load frequency distribution for each of the divided regions (the regions A to H) based on the bearing load measurement data (the magnitude Fp(t) of the load, the direction $\theta(t)$ of the load) and the rotational speed data (N(t)) for each of the obtained divided regions (regions A to H). More specifically, the fatigue state prediction unit 14 obtains the load frequency distribution through the following Expression (3) based on the bearing load measurement data Fp(t) and rotational speed data N(t) applied to each of the divided regions (the regions A to H) at the time t, 3).

[Ex. 3]

$$v_i = v_i + N(t)\Delta t, \text{ if } P_i \leq F(t) < P_i, \quad (3)$$

In the expression, symbol $v_i$ is a total number of rotations (cumulative rotational speed) when a load $P_i$ is applied, and $\Delta t$ is a sampling interval (sampling period).

Now, refer to FIG. 7. A lower portion of FIG. 7 shows the load frequency distribution for each of the divided regions (regions A to C) by taking the total number of rotations (cumulative number of rotations) N on the horizontal axis, and taking the load P on the vertical axis. For example, as shown in FIG. 7, in the region A which is the divided region of the outer ring 5, the total number of rotations (cumulative number of rotations) is obtained for each load $\Delta P$ applied to the region A. More particularly, the total number of rotations (cumulative number of rotations) when a load $P_{i-1}$ is applied to the region A is $v_{i-1}$, the total number of rotations (cumulative number of rotations) when the load $P_i$ is applied to the region A, Is $v_i$ and the total number of rotations (cumulative number of rotations) when the load $P_{i+1}$ is applied to the region A is $v_{i+1}$. Similarly, the total number of rotations (cumulative number of rotations) when the load $P_{i-1}$ is applied to the region B is $v_{i-1}$, the total number of rotations (cumulative number of rotations) when the load $P_i$ is applied to the region B is $v_i$, the total number of rotations (cumulative number of rotations) when the load $P_{i+1}$ is applied to the region B is $v_{i+1}$. The same is applied to the region C. The load frequency distribution for each of the divided regions obtained by the fatigue state prediction unit 14 in the above-mentioned Step S12 in FIG. 7 indicates that the load $P_i$ has been applied for the longest in the region A, and the load $P_{i-2}$ has been applied for the longest in the region B, and the load $P_{i-2}$ has been applied for the longest time in the region C.

Returning to FIG. 6, in Step S13, the fatigue state prediction unit 14 reads and obtains a lubrication condition and a filter condition set in advance by an operator from the storage unit 15 through the internal bus 18.

Subsequently, in Step S14, the fatigue state prediction unit 14 calculates a correction coefficient $a_{iso}$ in Expression (2) for obtaining the above-described modified rated life Lnm based on the obtained lubrication condition and filter condition.

In Step S15, the fatigue state prediction unit 14 calculates a cumulative damage degree Dj for each of the divided regions (region A to region H) based on the load frequency distribution obtained in Step S12 and the correction coefficient $a_{iso}$ calculated in Step S14. In this example, j is the number of divided regions. In the present embodiment, since the example in which the outer ring 5 is divided into the eight regions of the region A to the region H is shown, j=1 to 8.

Specifically, the fatigue state prediction unit 14 first calculates the above-described Expression (2) using the correction coefficient $a_{iso}$ calculated in Step S14 and obtains a modified rated life Lnm curve 28.

As a result, the obtained Lnm curve 28 is added to a graph of the load frequency distribution for each divided region shown in the lower portion of FIG. 7. For example, in the region A, if the total number of rotations (cumulative number of rotations) $v_{i+2}$ when the load $P_{i+2}$ is added reaches the Lnm curve 28, it is predicted that the rolling bearing 2 including the outer ring 5 having the divided region A is damaged with a probability of n %.

Next, the fatigue state prediction unit 14 calculates the cumulative damage degree Dj for each divided region through the following Expression (4) using the Lnm curve 28 which is the modified rated life obtained and the load frequency distribution obtained in Step S12.

[Ex. 4]

$$D_j = \sum_{i=1}^{I} \Delta D_j = \sum_{i=1}^{I} \frac{v_j}{L_{nm,j}} \quad (4)$$

Now, refer to FIG. 7. In FIG. 7, as shown in a lower portion of the load frequency distribution for each divided region, in Step S15, a cumulative damage degree $D_A$ is obtained for the region A which is the divided region of the outer ring 5, a cumulative damage degree $D_B$ is obtained for the region B, and a cumulative damage degree $D_C$ is obtained for the region C.

Subsequently, in Step S16 of FIG. 6, the fatigue state prediction unit 14 calculates the damage probability for each divided area based on the cumulative damage degree Dj for each divided area obtained in Step S15. In this example, in the calculation of the damage probability for each divided region, when the cumulative damage degree of the divided region in which the cumulative damage degree Dj for each divided region obtained by calculation of the above Expression (4) in Step S15 is maximum is Dj=1, the damage probability of the rolling bearing 2 becomes n %.

In Step S17, the fatigue state prediction unit 14 reads and obtains the damage amount γ at the time of occurrence of a failure stored in the storage unit 15 through the internal bus 18. In this example, the damage amount γ at the time of occurrence of the failure is, for example, the cost required for exchanging the parts of the rolling bearing 2 per se and the cost loss caused by stopping the rotating machine having the rolling bearing for parts replacement, and the damage amount γ corresponds to the above "degree of influence".

In Step S18, the fatigue state prediction unit 14 calculates the risk by multiplying the damage probability obtained in Step S16 by the "damage amount γ in case of failure occurrence" obtained in Step S17.

With the execution of Step S18, the processing of the rolling bearing fatigue state prediction device 1 is completed.

The storage unit 15 stores the bearing load measurement data (the load magnitude Fp(t), the load direction θ(t)) and the rotation speed data (N(t)) obtained by the above-described processing of Steps S11 to S18), the load frequency distribution obtained for each divided region, the cumulative damage degree Dj obtained for each divided region, the damage probability, and the risk linked with each other, for example, at each time t in a predetermined storage region.

In the present embodiment, Step S11 shown in FIG. 6 is executed by the load applied region identification unit 13. However, the present invention is not limited to the above configuration, but the processing from Step S11 to Step S18 inclusive of Step S11 may be executed by the fatigue state prediction unit 14.

In addition, in the present embodiment, as one example, in Step S11 shown in FIG. 6, the load applied region identification unit 13 identifies a region to which the load is applied among the divided regions divided in the circumferential direction of the rolling bearing 2. However, the present invention is not limited to the above configuration. For example, Steps S11 to S15 shown in FIG. 6 may be executed by the load applied region identification unit 13, and the divided region corresponding to the maximum cumulative damage degree Dj in the cumulative damage degree Dj for each divided area obtained in Step S15 may be identified as the load applied region by the load applied region identification unit 13. In that case, the fatigue state prediction unit 14 executes the subsequent Steps S16 to S18.

Hereinafter, a description will be given of a display form that the display control unit 16 displays the fatigue state prediction result of the rolling bearing 2, which is obtained by the entire processing flow of the rolling bearing fatigue state prediction device 1 shown in FIG. 6 described above, on the display screen of the display unit 22 through the output I/F 17.

Figure 8:
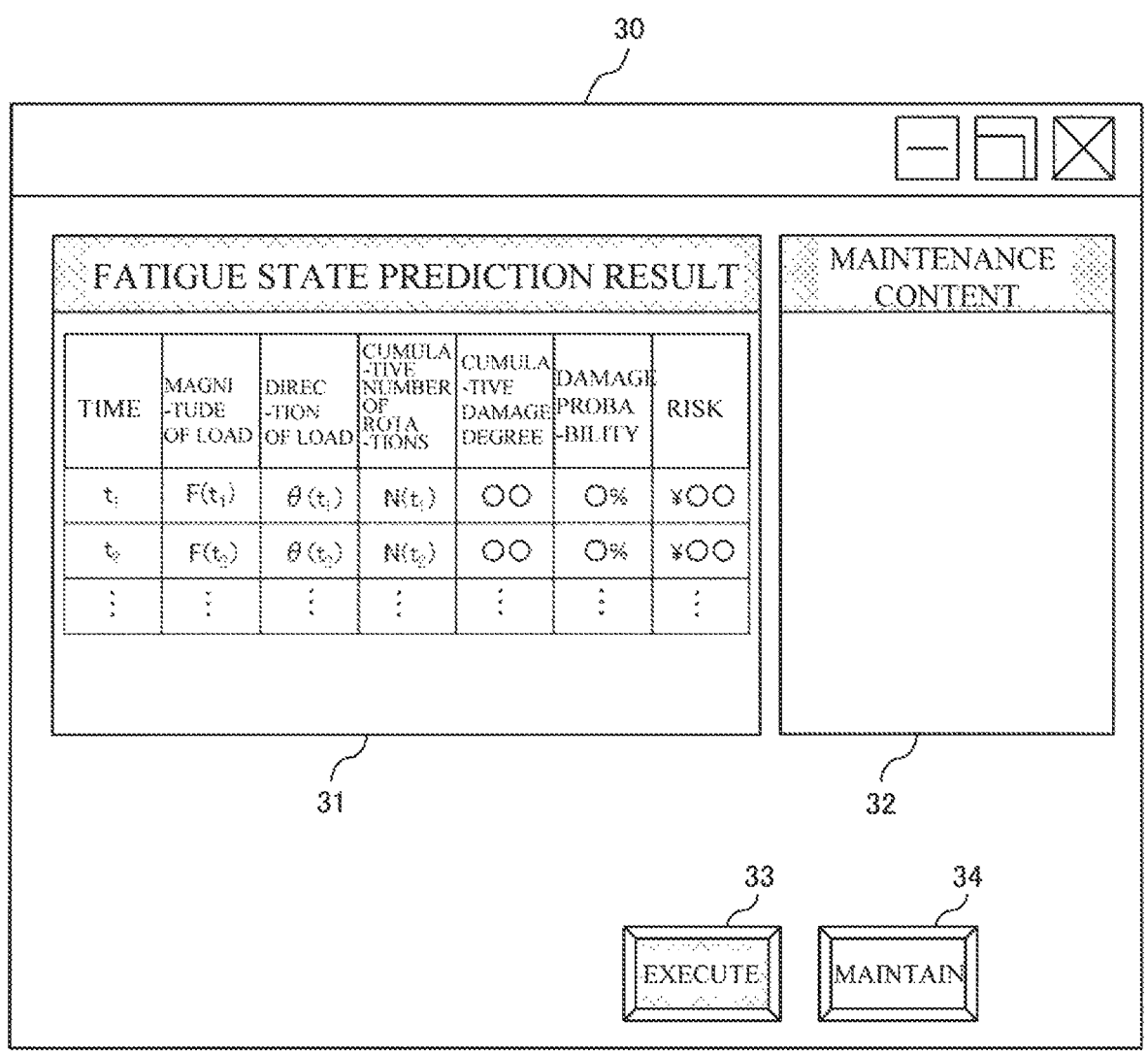
FIG. 8 is a diagram showing one example of a screen display of a display unit shown in FIG. 2.
Figure 9:
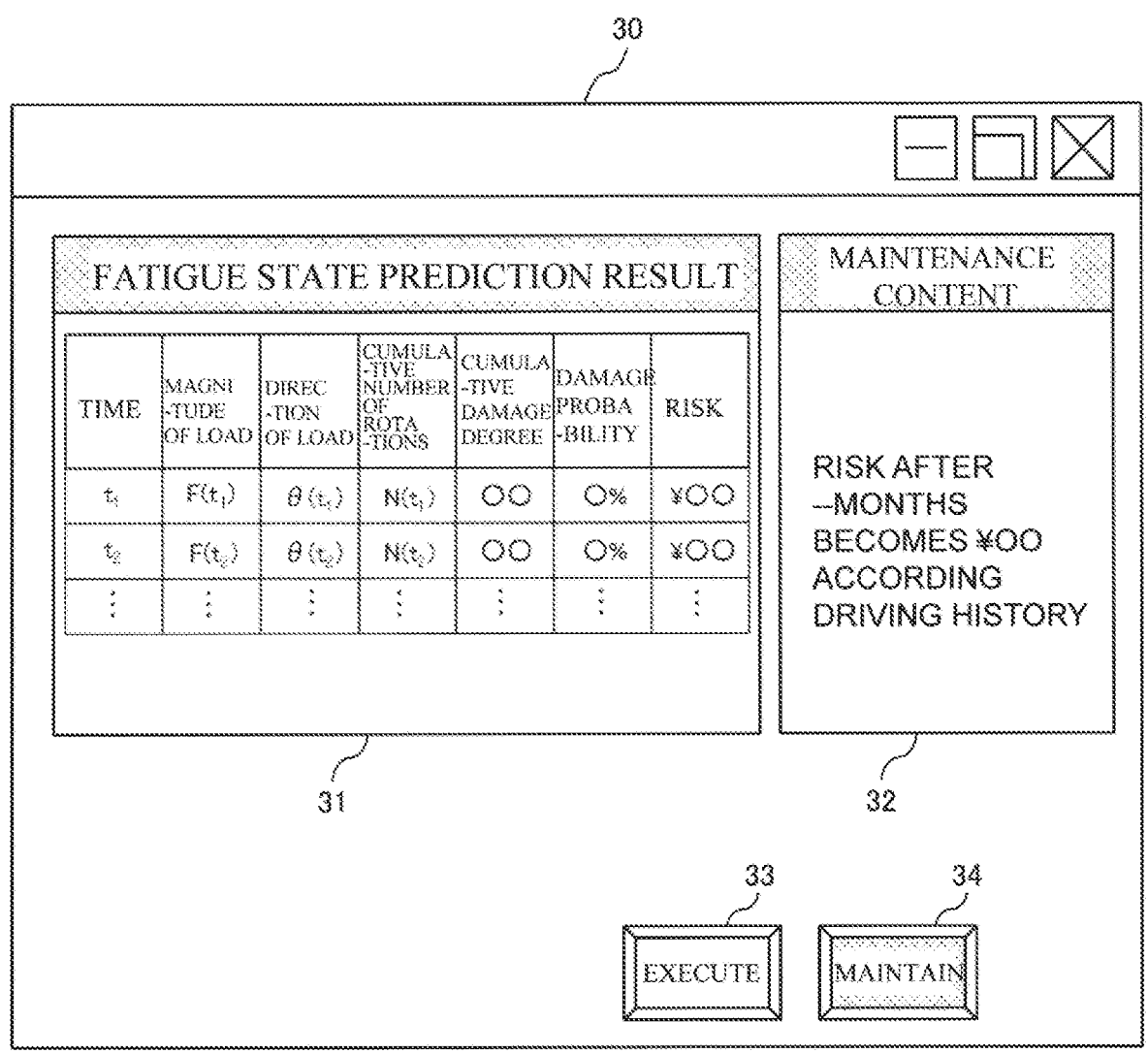
FIG. 9 is a diagram showing another example of the screen display of the display unit shown in FIG. 2.

FIGS. 8 and 9 are diagrams showing an example of a screen display of the display unit 22 shown in FIG. 2. As shown in FIG. 8, a display screen 30 of the display unit 22 includes a first display area 31 for displaying a predicted fatigue condition result of the rolling bearing 2, a second display area 32 for displaying a message relating to maintenance, a second display area 32 for displaying a message relating to maintenance, and an area (hereinafter referred to as command input area) in which an "execute" button 33 and a "maintenance" button 34 for entering various commands are displayed. In addition, in an area displayed on the uppermost portion of the display screen 30, buttons for designating closing and a reduction/enlargement display of the entire window in which the first display area 31 and the second display area 32 are displayed, and movement of the entire display screen 30 to a control bar of the display unit 22 are displayed.

As shown in FIG. 8, when the operator moves a mouse pointer onto the "execute" button 33 by the input unit 21 such as a mouse and clicks the "execute" button 33, the "execute" button 33 becomes active. In response to the activation, the display control unit 16 (FIG. 2) displays "time", "the magnitude of the load", "cumulative number of" rotations "(total number of rotations), "cumulative damage degree", "damage probability", and "risk", which have been obtained through the processing of Steps S11 to S18 in FIG. 6 by the load applied region identification unit 13 and the fatigue state prediction unit 14 configuring the arithmetic unit 10 described above through the internal bus 18 and the output I/F 17, so as to be visible in the form of a table, in the first display area 31.

As shown in FIG. 8, in the first display area 31, as the fatigue state prediction result, when "the time" is "$t_1$", "the magnitude of the load" is displayed as "F ($t_1$)", "the direction of the load" is displayed as "$\theta(t_1)$", "the cumulative number of rotations" (total number of rotations) is displayed as "N($t_1$)", "the cumulative damage degree" is displayed as "--", "the damage probability" is displayed as "- %", and "the risk" is displayed as "Y --". In this way, the fatigue state of the divided region labeled on the inner ring 4 or the outer ring 5, which is predicted to have the most severe fatigue state obtained (cumulative Damage degree, damage probability, risk) is displayed for each time.

In the display state shown in FIG. 8, when the operator moves the mouse pointer onto the "maintenance" button 34 by the input unit 21 such as a mouse and clicks the "maintenance" button 34, the "maintenance" button 34 becomes active. Accordingly, the screen shifts to a screen display example shown in FIG. 9. As shown in FIG. 9, the display content of the first display area 31 is the same as the state shown in FIG. 8. When the display control unit 16 (FIG. 2) detects that the "maintenance" button 34 has become active, the display control unit 16 controls the display unit 22 through the output I/F 17 so as to display a message promoting the operator to change the replacement timing or an operation plan in the second display area 32, for example, "the risk after 10 months (years later, days later, or the like) from the driving history will be \OO", or "the operation plan needs to be changed or exchanged". In this case, as the message related to maintenance displayed in the second display area 32, for example, a message "after -- months from the driving history (period can be set), a risk becomes \OO", "there is a need to change or to replace the operation plan", or "If you changes the operation plan, the risk will be \OO months later (years later, days later, or the like)" is displayed. Those messages are stored in advance in the storage unit 15. In order to select those messages, multiple threshold values are set in advance for the values of "cumulated damage degrees" and/or "damage probability" obtained by the load applied region identification unit 13 and the fatigue state prediction unit 14 that configure the arithmetic unit 10 and are stored in a predetermined storage area of the storage unit 15. The multiple threshold values correspond to respective different messages. The display control unit 16 compares the multiple threshold values stored in the storage unit 15 with the "cumulative damage degree" and/or "damage probability" obtained by the fatigue state prediction unit 14 of the arithmetic unit 10, and selects the message to be displayed in the second display area 32. Instead of the display control unit 16, the fatigue state prediction unit 14 may compare the multiple threshold values stored in the storage unit 15 with the "cumulative damage degree" and/or "damage probability" obtained by the fatigue state prediction unit 14, and select the message to be displayed in the second display area 32.

In this way, since the fatigue state (cumulative damage degree, damage probability, risk) of the divided regions labeled on the inner ring 4 or the outer ring 5, which is expected to have the most severe fatigue state of the rolling bearing 2 at each time, is displayed in the first display area 31, since the operator can easily confirm the fatigue state of the rolling bearing on the display screen, the replacement timing of the rolling bearing can be optimized. In addition, since the message relating to maintenance corresponding to the result of predicting the fatigue state of the rolling bearing 2 is displayed in the second display area 32, the operator can immediately start a maintenance work.

Figure 10:
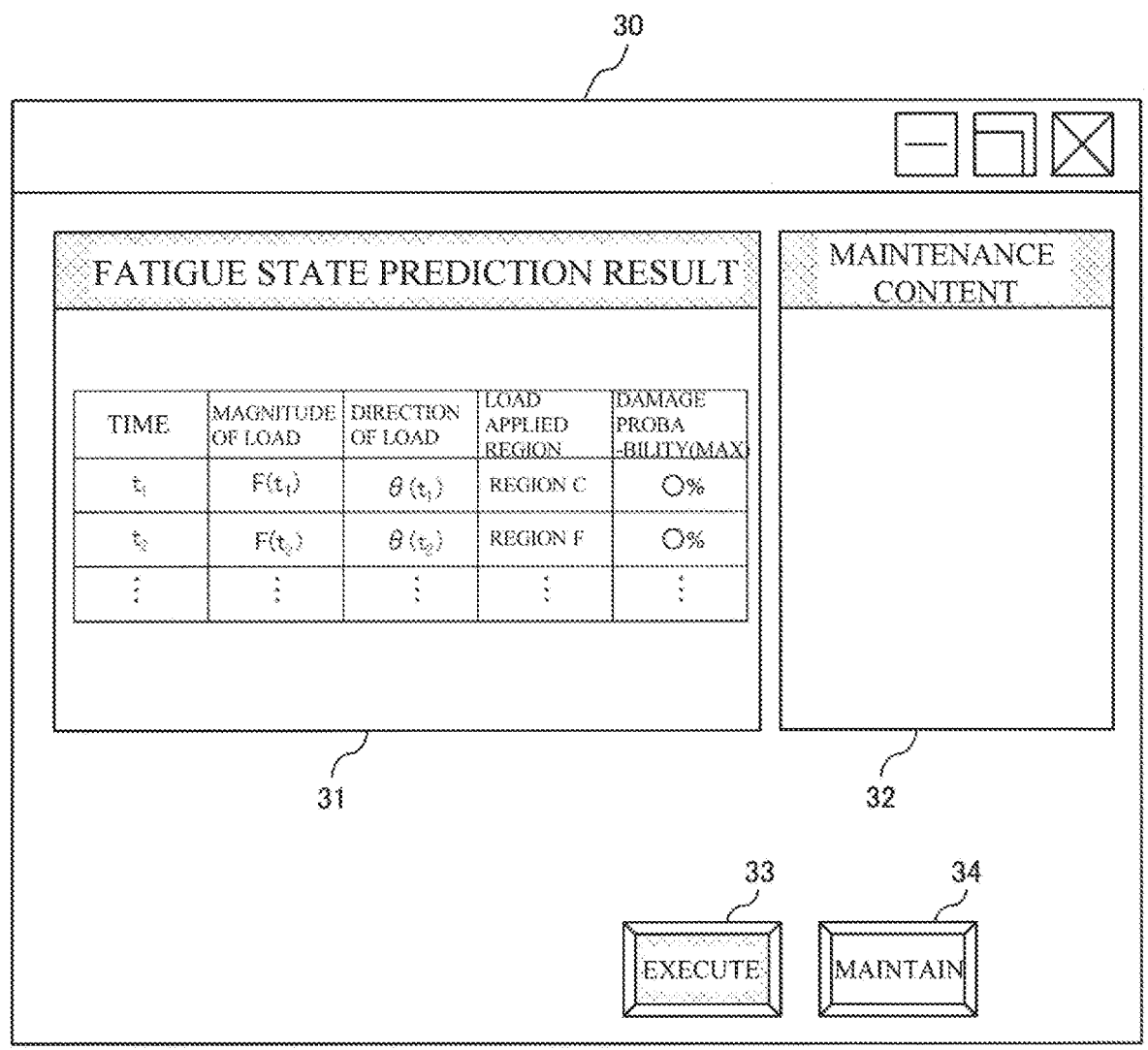
FIG. 10 is a diagram showing still another example of the screen display of the display unit shown in FIG. 2.
Figure 11:
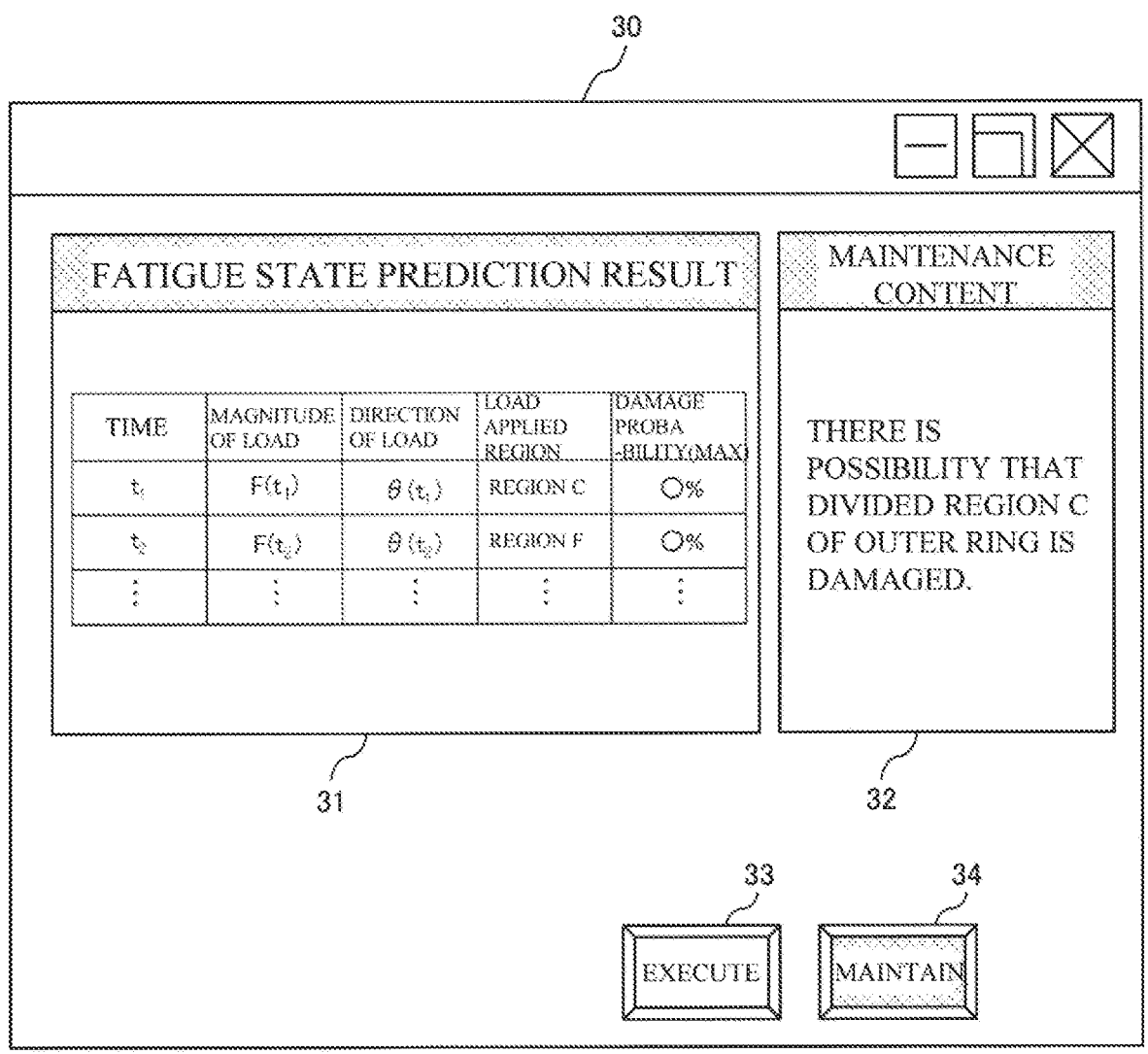
FIG. 11 is a diagram showing yet another example of the screen display of the display unit shown in FIG. 2.

FIGS. 10 and 11 are diagrams showing an example of the screen display of the display unit shown in FIG. 2. As shown in FIG. 10, when the operator moves the mouse pointer over the "execute" button 33 by the input unit 21 such as a mouse and clicks the "execute" button 33, the "execute" button 33 becomes active. In response to the activation of the "execute" button 33, the display control unit 16 (FIG. 2) displays "time", "the magnitude of the load", "the direction of the load", "load applied region", and "damage probability (maximum)", which have been obtained through the processing of Steps S11 to S16 in FIG. 6 by the load applied region identification unit 13 and the fatigue state prediction unit 14 configuring the arithmetic unit 10 described above through the internal bus 18 and the output I/F 17, so as to be visible in the form of a table, in the first display area 31.

As shown in FIG. 10, in the first display area 31, as the fatigue state prediction result, when "the time" is "$t_1$", "the magnitude of the load" is displayed as "F ($t_1$)", "the direction of the load" is displayed as "$\theta(t_1)$", "the load applied region" is displayed as "region C", and "the damage probability (maximum" is displayed as "- %". This shows that at the time $t_1$, the divided region whose damage probability is maximum among the divided regions A to H labeled on the outer ring 5 configuring the rolling bearing 2 in is the region C.

In the display state shown in FIG. 8, when the operator moves the mouse pointer onto the "maintenance" button 34 by the input unit 21 such as a mouse and clicks the "maintenance" button 34, the "maintenance" button 34 becomes active. In response to the activation of the "maintenance" button 34, the screen shifts to a screen display example shown in FIG. 11. As shown in FIG. 11, the display content of the first display area 31 is the same as the state shown in FIG. 10. When the display control unit 16 (FIG. 2) detects that the "maintenance" button 34 has become active, the display control unit 16 controls the display unit 22 through the output I/F 17 so as to display a message promoting the operator to replace the outer ring as the parts in the second display area 32, for example, "there is a possibility that a damage occurs in the divided region C of the outer ring". In this case, as the message related to maintenance displayed in the second display area 32, for example, in addition to the above-mentioned message "there is a possibility that a damage occurs in the divided region C of the outer ring", "there is a possibility that the damage occurs in the divided region -- of the inner ring", "after -- months from the driving history (years later, days later, or the like), a risk becomes \OO", or "there is a need to change or to replace the operation plan" is displayed. Those messages are stored in advance in the storage unit 15. In order to select those messages, multiple threshold values are set in advance for the value of "damage probability (maximum)" obtained by the load applied region identification unit 13 and the fatigue state prediction unit 14 that configure the arithmetic unit 10 and are stored in a predetermined storage area of the storage unit 15. The multiple threshold values correspond to respective different messages. The display control unit 16 compares the multiple threshold values stored in the storage unit 15 with the "c "damage probability" obtained by the fatigue state prediction unit 14 of the arithmetic unit 10, and selects the message to be displayed in the second display area 32. Instead of the display control unit 16, the fatigue state prediction unit 14 may compare the multiple threshold values stored in the storage unit 15 with the "damage probability" obtained by the fatigue state prediction unit 14, and select the message to be displayed in the second display area 32.

In this way, since the divided region labeled on the inner ring 4 or the outer ring 5 configuring the rolling bearing 2, whose damage probability at each time is maximum, is displayed in the first display area 31, the operator can easily confirm the fatigue state of the divided region of the inner ring 4 or the outer ring 5 configuring the rolling bearing 2 on the screen. As a result, even if the direction of the load acting on the rolling bearing 2 changes, the divided region (load applied region) of the inner ring 4 or the outer ring 5 whose fatigue state is maximum can be easily grasped. In addition, since the message relating to maintenance corresponding to the result of predicting the fatigue state of the rolling bearing 2 is displayed in the second display area 32, the operator can immediately start a maintenance work.

In the present embodiment, as shown in FIGS. 8 to 11, the first display area 31 and the second display area 32 are provided on the display screen 30 of the display unit 22, but the present invention is not limited to the above configuration. For example, with the provision of one display area on the display screen 30, the fatigue state prediction result displayed in the first display area 31 shown in FIG. 8 and the message related to the maintenance displayed in the second display area 32 shown in FIG. 9 may be switchably displayed. Likewise, the fatigue state prediction result displayed in the first display area 31 shown in FIG. 10 and the message related to the maintenance displayed in the second display area 32 may be switchably displayed.

Further, only the fatigue state prediction result displayed in the first display area 31 shown in FIG. 8 may be displayed on the display screen 30. Similarly, in this way, since the fatigue state (cumulative damage degree, damage probability, risk) of the divided regions labeled on the inner ring 4 or the outer ring 5, which is expected to have the most severe fatigue state of the rolling bearing 2 at each time, is displayed, since the operator can easily confirm the fatigue state of the rolling bearing on the display screen, the replacement timing of the rolling bearing can be optimized.

In addition, only the fatigue state prediction result displayed in the first display area 31 shown in FIG. 10 may be displayed on the display screen 30. Also, in this case, since the divided region labeled on the inner ring 4 or the outer ring 5 configuring the rolling bearing 2, whose damage probability at each time is maximum, is displayed, the operator can easily confirm the fatigue state of the divided region of the inner ring 4 or the outer ring 5 configuring the rolling bearing 2 on the screen.

According to the present invention, there can be provided a rolling bearing fatigue state prediction device and a rolling bearing fatigue state prediction method which are capable of predicting a fatigue state of a rolling bearing with high accuracy even when a direction of a load applied to the rolling bearing changes.

In addition, according to the present embodiment, since the operator can easily confirm the fatigue state of the rolling bearing on the display screen, the replacement timing of the rolling bearing can be optimized, as a result of which the availability factor can be improved.

Second Embodiment

Figure 12:
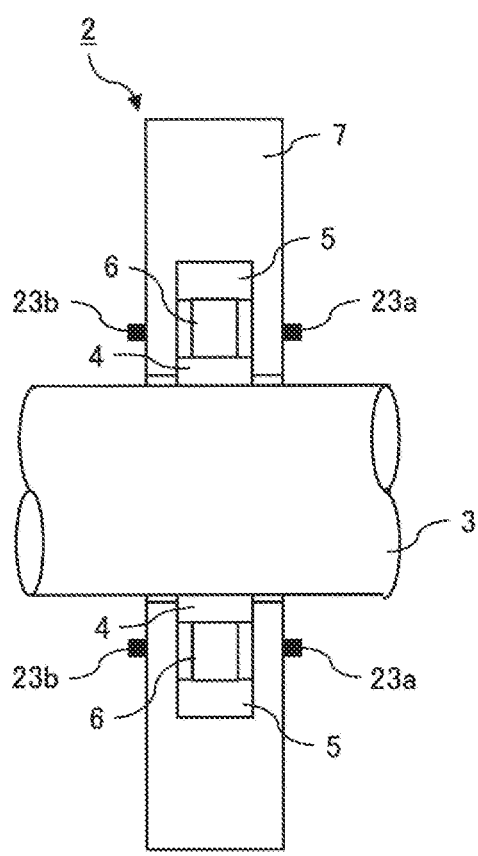
FIG. 12 is a longitudinal sectional view of a rolling bearing fatigue state prediction device according to a second embodiment, which is another embodiment of the present invention, taken along a plane parallel to a longitudinal direction of a rotating shaft of the rolling bearing.

FIG. 12 is a longitudinal sectional view taken along a plane parallel to a longitudinal direction of a rotating shaft of a rolling bearing in a rolling bearing fatigue state prediction device according to a second embodiment which is another embodiment of the present invention. The present embodiment is different from the first embodiment in that a non-contact type displacement sensor is used in place of the load sensors 8a to 8h, and a stress-load database is provided in an arithmetic unit configuring the rolling bearing fatigue condition prediction device. The other configurations are identical with those in the first embodiment, and in the following description, the same components as those shown in the first embodiment are denoted by identical symbols, and a repetitive description of the first embodiment will be omitted.

As shown in FIG. 12, a pair of non-contact type displacement sensors 23a and 23b are placed in a bearing housing 7 so as to sandwich rolling elements 6 disposed between an inner ring 4 and an outer ring 5 configuring a rolling bearing 2 in an axial direction. Multiple sets of the non-contact type displacement sensors 23a and 23b are spaced apart from each other at a predetermined interval in a circumferential direction of the bearing housing 7. The non-contact displacement sensors 23a and 23b are formed of an ultrasonic probe or the like. If the pair of non-contact displacement sensors 23a and 23b are installed on inner wall surfaces of the bearing housing 7 facing both end surfaces of each rolling element 6 without coming in contact with both end surfaces of the rolling element 6 in the axial direction, for example, the pair of non-contact displacement sensors 23a and 23b are formed of an eddy current type, a laser displacement meter, or the like.

Figure 13:
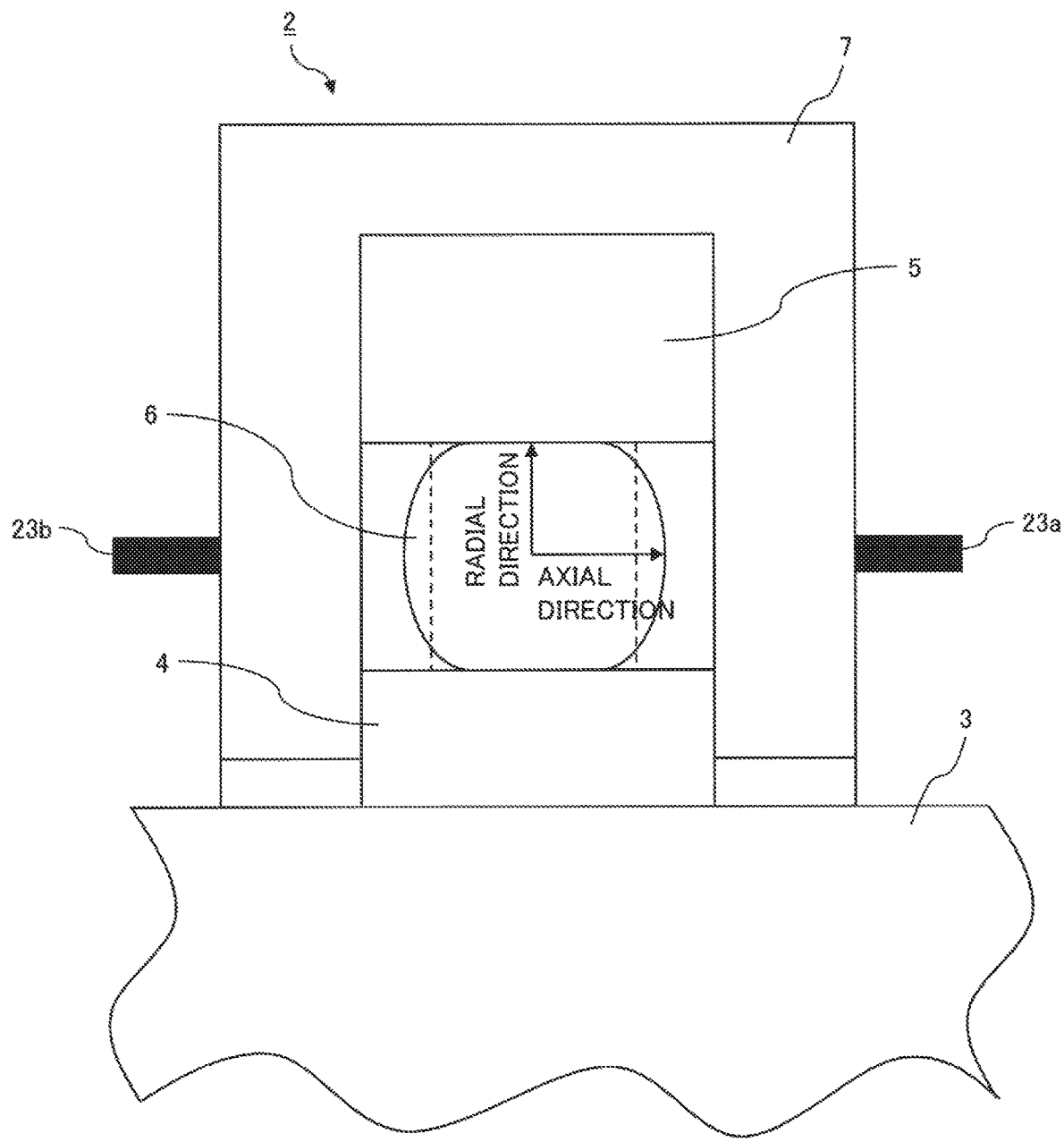
FIG. 13 is a partially enlarged view of FIG. 12, showing a state of a region to which a bearing load is applied.

FIG. 13 is a partially enlarged view of FIG. 12, which is a diagram showing a state of a region to which a bearing load is applied. As shown in FIG. 13, a stress a ($=E\varepsilon$) occurs in the rolling element 6 located in a direction of the load applied to the rolling bearing 2 due to a load of the rolling element 6, on a contact surface between an outer circumferential surface of the inner ring 4 and an outer circumferential surface of the rolling element 6, and on a contact surface between an inner circumferential surface of the outer ring 5 and the outer circumferential surface of the rolling element 6. In this case, E is the Young's modulus of the rolling element 6 and $\varepsilon$ is an elastic strain in the radial direction of the rolling element 6. When the rolling element 6 is deformed in the radial direction, the rolling element 6 is deformed in the axial direction by the Poisson's ratio at the same time. In FIG. 13, two dotted lines extending in the radial direction indicated in an existence region of the rolling element 6 indicate positions of both end surfaces of the rolling element 6 in the axial direction in the case where no stress a occurs in the contact surface of the outer circumferential surface of the inner ring 4 and the outer circumferential surface of the rolling element 6, and the contact surface of the inner circumferential surface of the outer ring 5 and the outer circumferential surface of the rolling element 6.

As shown in FIG. 13, with the application of the bearing load, an elongation by which the rolling element 6 is deformed in the axial direction by the Poisson's ratio is obtained as $\nu\varepsilon D$. In this case, D is a diameter of the rolling element 6, $\nu$ is the Poisson ratio, and $\varepsilon$ is the elastic strain in the radial direction. The elongation $\nu\varepsilon D$ is detected by the non-contact displacement sensors 23a and 23b installed in the bearing housing 7 so as to sandwich the rolling element 6 in the axial direction. Specifically, for example, the non-contact type displacement sensor 23a configured by an ultrasonic probe irradiates an ultrasonic wave toward an end surface of the rolling element 6 on a right side in the axial direction in FIG. 13 and the non-contact type displacement sensor 23a detects a reflected wave from the end surface of the rolling element 6 on the right side in the axial direction, to thereby measure the amount of elongation (the amount of displacement from a position indicated by the dotted line) of the end surface of the rolling element 6 on the right side in the axial direction. Likewise, the non-contact type displacement sensor 23b irradiates an ultrasonic wave toward an end surface of the rolling element 6 on a left side in the axial direction in FIG. 13 and the non-contact type displacement sensor 23b detects a reflected wave from the end surface of the rolling element 6 on the left side in the axial direction, to thereby measure the amount of elongation (the amount of displacement from a position indicated by the dotted line) of the end surface of the rolling element 6 on the left side in the axial direction.

For example, in the case where the pair of non-contact type displacement sensors 23a and 23b each configured by a laser displacement meter are installed on the inner wall surfaces of the bearing housing 7, which face the respective both end surfaces of the rolling element 6 in the axial direction without coming in contact with the both end surfaces of the rolling element 6 in the axial direction, the laser displacement meter measures an elongation amount (the amount of displacement from the position indicated by the dotted line) of the end surface of the rolling element 6 on the right side in the axial direction and an elongation amount (the amount of displacement from the position indicated by the dotted line) of the end surface of the rolling element 6 on the left side in the axial direction.

Figure 14:
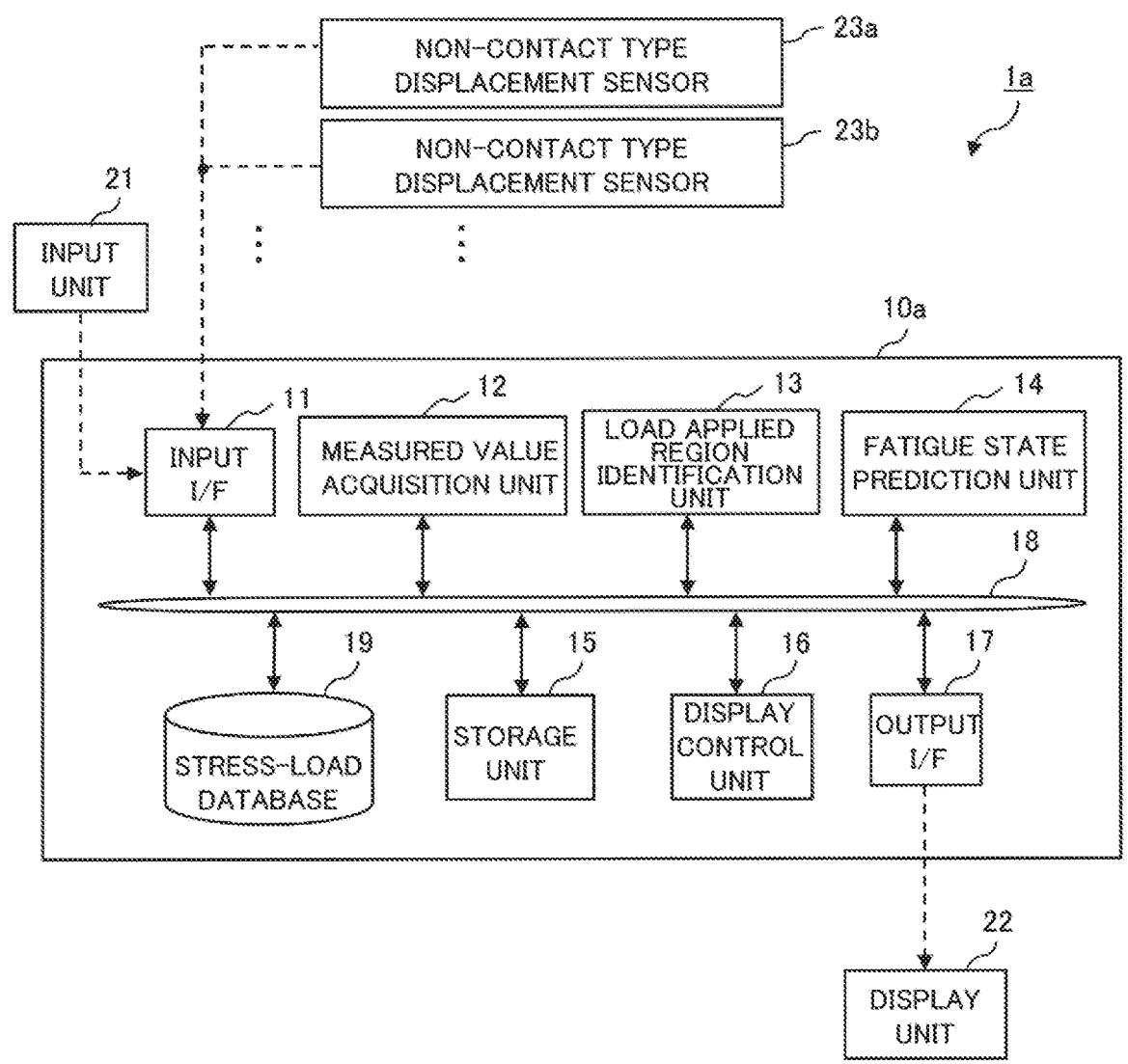
FIG. 14 is a functional block diagram of a rolling bearing fatigue state prediction device according to the second embodiment.

FIG. 14 is a functional block diagram of a rolling bearing fatigue state prediction device 1a of the present embodiment. As compared with the bearing fatigue state prediction device 1 according to the first embodiment shown in FIG. 1 described above, in the rolling bearing fatigue state prediction device 1a according to the present embodiment, the elongation amount (displacement amount) of the rolling element 6 measured by multiple sets of the paired non-contact type displacement sensors 23a and 23b is input to the input I/F 11 configuring the arithmetic unit 10a in a wired manner or wirelessly. The measured value acquisition unit 12 subjects the elongation amount (the amount of displacement) of the rolling element 6 measured by the multiple sets of paired non-contact displacement sensors 23a and 23b to a smoothing process such as A/D conversion and noise removal and transfers the smoothed elongation amount to the load applied region identification unit 13 through the internal bus 18 while storing the smoothed elongation amount in a predetermined storage area of the storage unit 15. The measured value acquisition unit 12 converts the measured number of rotations from, for example, an encoder (not shown) into rotational speed data and transfers the converted rotational speed data to the load applied region identification unit 13 through the internal bus 18 while storing the converted rotational speed data into a predetermined storage area of the storage unit 15.

Figure 15:
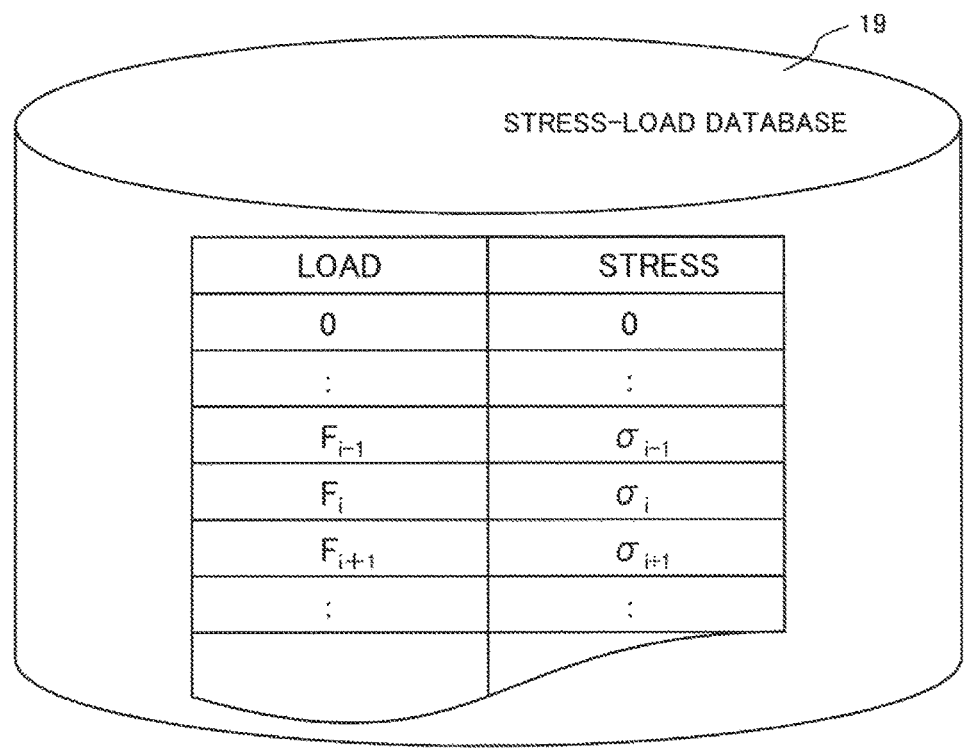
FIG. 15 is an illustrative diagram of one data structure of a stress-load database shown in FIG. 14.
Figure 16:
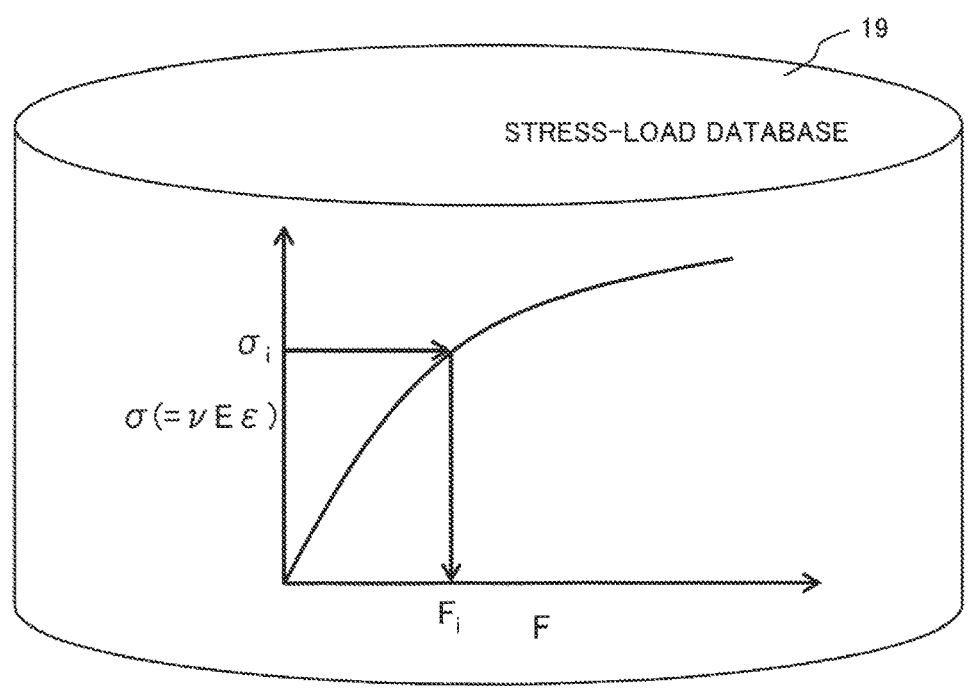
FIG. 16 is an illustrative diagram of another data structure of a stress-load database shown in FIG. 14.

A stress-load database 19 stores in advance a load F applied to the rolling bearing 2 and a stress a occurring in the contact surface between the outer circumferential surface of the inner ring 4 and the outer circumferential surface of the rolling element 6 and the contact surface between the inner circumferential surface of the outer ring 5 and the outer circumferential surface of the rolling element 6 in association with each other. FIG. 15 is an illustrative view of a data structure of the stress-load database 19. As shown in FIG. 15, the stress-load database 19 stores, in a table format, the load F applied to the rolling bearing 2 and the stress a occurring in the contact surface between the outer circumferential surface of the inner ring 4 and the outer circum-ferential surface of the rolling element 6 and the contact surface between the inner circumferential surface of the outer ring 5 and the outer circumferential surface of the rolling element 6 in association with each other. For example, when the stress is $\sigma_i$, the load applied to the corresponding rolling bearing 2 is $F_i$. Also, FIG. 16 is an illustrative diagram of the data structure of the load database 19 shown in FIG. 14. As shown in FIG. 16, the horizontal axis indicates the load F applied to the rolling bearing 2, the vertical axis indicates the stress a (=vεE), which are stored as a function. For example, when the stress is $\sigma_i$, the load applied to the corresponding rolling bearing 2 is $F_i$.

Returning to FIG. 14, the load applied region identification unit 13 obtains the stress a occurring in the contact surface between the outer circumferential surface of the inner ring 4 and the outer circumferential surface of the rolling element 6 and the contact surface between the inner circumferential surface of the outer ring 5 and the outer circumferential surface of the rolling element 6. Next, the load applied region identification unit 13 accesses the stress-load database 19 through the internal bus 18 and reads the load F applied to the rolling bearing 2, which corresponds to the stress a obtained from the stress-load database 19. In this example, the load F applied to the rolling bearing 2 that has been read out corresponds to the bearing load measurement data (magnitude Fp(t) of the load) obtained in Step S11 shown in FIG. 6. In addition, since the paired non-contact type displacement sensors 23a and 23b are spaced apart from each other at a predetermined interval in the circumferential direction, the load applied region identification unit 13 obtains the direction θ(t) of the load applied to the rolling bearing 2 from the paired multiple non-contact type displacement sensors 23a and 23b through the input I/F 11. As a result, the load applied region identification unit 13 obtains Step S11 shown in FIG. 6 described above, that is, the bearing load measurement data (the magnitude Fp(t) of the load, the direction θ(t) of the load, and the rotational speed data (N(t)). Hereinafter, the processing in Steps S12 to S18 shown in FIG. 6 is the same as that in the first embodiment, and therefore a description of the processing will be omitted.

According to the present embodiment, in addition to the effects of the first embodiment, in the case where the ultrasonic probe is used as the non-contact type displacement sensors 23a and 23b, only when the non-contact type displacement sensors 23a and 23b are installed on the outer wall surface of the bearing housing 7 configuring the rolling bearing 2, the bearing load measurement data (the magnitude Fp(t) of the load, the direction θ(t) of the load) can be obtained. Hence, as described in the first embodiment, there is no need to provide the concave portion 9 in the inner circumferential surface of the outer bearing housing 7 or the outer circumferential surface of the rotating shaft 3 in order to place the load sensors 8a to 8h, thereby being capable of easily installing the non-contact displacement sensor economically.

Further, even if, for example, a laser displacement meter is used as the multiple paired non-contact type displacement sensors 23a and 23b, since the laser displacement meter may be attached to the inner wall of the bearing housing 7 without coming in contact with the rolling elements 6, the non-contact type displacement sensor can be easily installed economically as compared with the configuration of the first embodiment.

Third Embodiment

Figure 17:
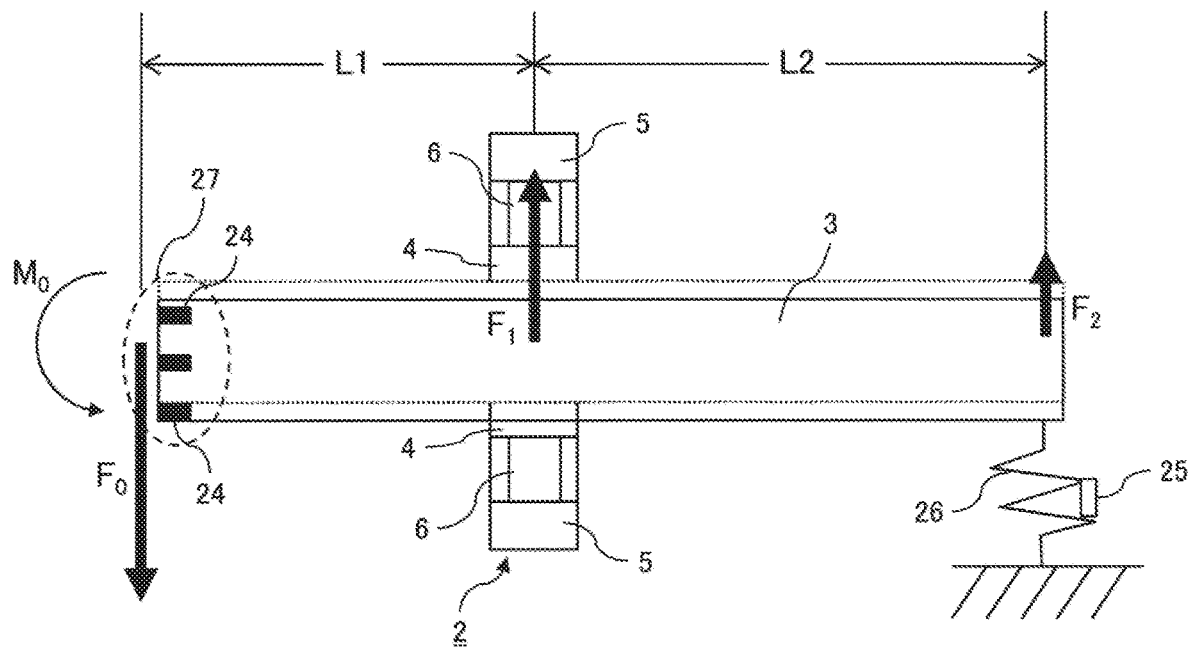
FIG. 17 is a longitudinal sectional view of a rolling bearing fatigue state prediction device according to a third embodiment which is still another embodiment of the present invention, taken along a plane parallel to a longitudinal direction of a rotating shaft of the rolling bearing.

FIG. 17 is a longitudinal sectional view of a rolling bearing fatigue state prediction device taken along a plane parallel to a longitudinal direction of a rotating shaft of a rolling bearing according to a third embodiment which is another embodiment of the present invention. The present embodiment is different from the first embodiment in that multiple strain sensors that are spaced apart from each other at predetermined intervals along a circumferential direction of a rotating shaft are provided on one end side of the rotating shaft by which the rolling bearing is rotatably supported in the axial direction (longitudinal direction), and a support unit whose spring constant is known and a displacement sensor attached to the support unit are provided on the other end side (an end opposite to a side where the strain sensors are disposed) of the rotating shaft in the axial direction. The other configurations are the same as those in the first embodiment. In the following description, the same reference numerals are given to the same components as those shown in the first embodiment, and duplicate description of the first embodiment will be omitted.

As shown in FIG. 17, a rotating shaft 3 is rotatably supported by a rolling bearing 2 and a support portion 26 whose spring constant is known, and multiple displacement sensors 25 are installed on the support 26 along a circumferential direction. In addition, multiple sensors 24 that are spaced apart from each other at predetermined intervals along the circumferential direction of the rotating shaft 3 are disposed on the other end side of the rotating shaft 3 in the axial direction, that is, in an axial end region 27 opposite to the support unit 26. The multiple strain sensors 24 are disposed to be paired on the front and back sides with respect to the rotating shaft 3. In other words, in a transverse section of the rotating shaft 3, the multiple strain sensors 24 are disposed along the circumferential direction of the rotating shaft 3 at symmetrical positions with respect to an axis center.

Next, a load measurement method will be described.

As shown in FIG. 13, it is assumed that a moment M0 and an external load $F_0$ are applied to the axial end region 27. $F_0=F_1+F_2$ is established with the balance of the load, and $M_0+F_0 (L_1+L_2)=F_1 L_2$ is established with the balance of the moments. In this case, the moment $M_0$ and the external loads F0, $F_1$, $F_2$ are unknown values.

A method of measuring the moment $M_0$ will be described.

In a transverse section of the rotating shaft 3, a bending stress σ is obtained by σ=E·ε/2 through a two-gauge method with the use of multiple strain sensors 24 disposed symmetrically with respect to the axial center and disposed along the circumferential direction of the rotating shaft 3. In addition, the bending stress a of the rotating shaft 3 can be expressed by σ=$M_0$/Z according to a secondary moment Z of area of the rotating shaft 3. As a result, $M_0$ can be obtained as $M_0$=(E·ε·Z)/2.

Next, how to obtain the load $F_2$ of the support unit 26 will be described.

A reaction force $F_2$ in the support unit 26 is obtained by $F_2$=$K_2$·Δd according to a spring constant $K_2$ and a displacement Δd measured by the displacement sensor 25 provided on the support unit 26. From the above calculation, the load $F_1$ applied to the rolling bearing 2 is calculated by the following Expression (5).

$$F_1=\{(L_2-L_1)K_2 \cdot \Delta d-(E \cdot \varepsilon \cdot Z)/2\}/L_1 \qquad (5)$$

Although not shown in FIG. 17, the configuration of the arithmetic unit 10 configuring the rolling bearing fatigue state prediction device 1 according to the present embodiment is the same as that of the functional block diagram of the arithmetic unit 10 shown in FIG. 2 described in the first embodiment described above. The present embodiment is different from the first embodiment in that in FIG. 2, the load sensors 8a to 8h are replaced with the multiple strain sensors 24 and the multiple displacement sensors 25 which are displaced along the circumferential direction of the rotating shaft 3 at the symmetrical positions with respect to the axial center in the transverse section of the rotating shaft 3.

Hence, the measured value acquisition unit 12 subjects the measured values measured by the multiple strain sensors 24 and the displacements Δd measured by the multiple displacement sensors 25 to the smoothing process such as A/D conversion and noise removal, and transfers the smoothed measured values and displacement to the load applied region identification unit 13 through the internal bus 18 while storing the smoothed measured values and displacement in a predetermined storage area of the storage unit 15. In addition, the measured value acquisition unit 12 converts the measured number of rotations from, for example, an encoder (not shown) not shown into rotational speed data and transfers the converted rotational speed data to the load applied region identification unit 13 through the internal bus 18 while storing the converted rotational speed data in a predetermined storage area of the storage unit 15.

The load applied region identification unit 13 calculates Expression (5) described above based on the measured values measured by the multiple strain sensors 24 and the displacements Δd measured by the multiple displacement sensors 25, which have been subjected to the smoothing process such as A/D conversion and noise removal, and obtains the load $F_1$ applied to the rolling bearing 2. The load $F_1$ applied to the rolling bearing 2 thus obtained corresponds to the bearing load measurement data (magnitude Fp(t) of the load) obtained in Step S11 shown in FIG. 6 described in the above first embodiment. In addition, since the multiple strain sensors 24 are disposed along the circumferential direction of the rotating shaft 3 at the symmetric positions with respect to the axial center in the transverse section of the rotating shaft 3, the direction θ(t) of the load applied to the rolling bearing 2 is obtained. As a result, the load applied region identification unit 13 obtains Step S11 shown in FIG. 6 described above, that is, the bearing load measurement data (the magnitude Fp(t) of the load, the direction θ(t) of the load, and the rotational speed data (N(t)). Hereinafter, the processing of Steps S12 to S18 shown in FIG. 6 are the same as that in the first embodiment, and therefore a description of the processing will be omitted.

According to the present embodiment, in addition to the effects of the first embodiment, the load applied to the rolling bearing 2 can be measured without disposing a sensor in the vicinity of the rolling bearing 2.

Fourth Embodiment

Figure 18:
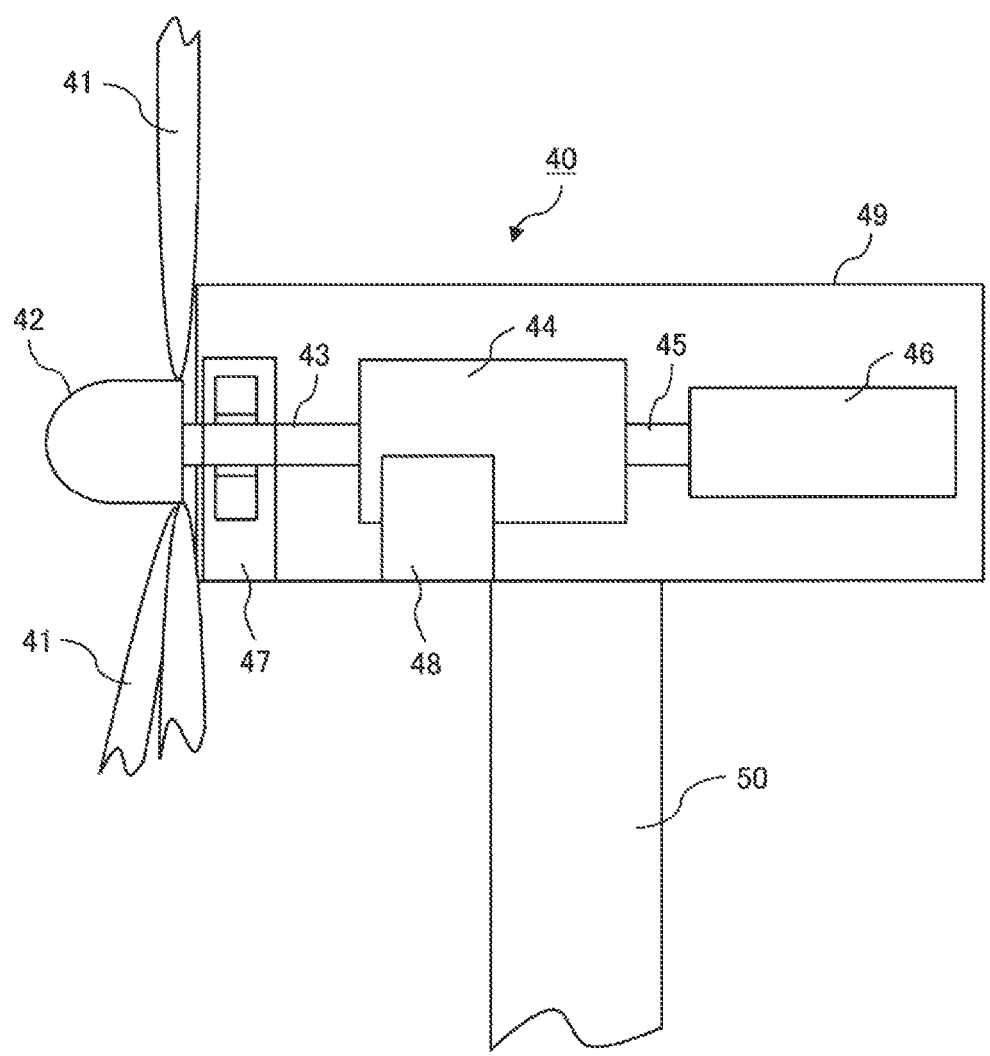
FIG. 18 is a schematic configuration diagram of a wind power generator according to a fourth embodiment which is yet another embodiment of the present invention, to which one of the rolling bearing fatigue state prediction devices of the first to third embodiments is applied.

FIG. 18 is a schematic configuration diagram of a wind power generator according to a fourth embodiment which is another embodiment of the present invention, in which one of the rolling bearing fatigue state prediction devices of the first to third embodiments is applied.

As shown in FIG. 18, a wind power generator 40 includes multiple blades 41 that rotate upon receiving wind, a hub 42 that supports the multiple blades 41, a nacelle 49, and a tower 50 that rotatably supports the nacelle 49. A spindle 43 that is connected to a hub 42 and rotates together with the hub 42, a speed increaser 44 for increasing a rotational speed of the spindle 43, and a power generator 46 that is connected to a power generator shaft 45 increased in speed by the speed increaser 44 are provided in the nacelle 49. In addition the inside of the nacelle 49 includes a spindle bearing 47 that rotatably supports the spindle 43 and a mount 48 that supports the speed increaser 44. When a wind load is applied to the multiple blades 41, the multiple blades 41 are rotated to convert a rotational energy into a generated energy. A self-aligning roller bearing is usually used as the spindle bearing 47.

When a wind load is applied to the multiple blades 41, a resultant force (thrust load) of the wind load applied to the multiple blades 41 is applied to the spindle bearing 47 in addition to the self-weight of each part. In this example, the multiple load sensors 8a to 8h are disposed along the circumferential direction, as shown in FIG. 3 described in the above first embodiment, on the inner circumferential surface of a bearing housing which configures the spindle bearing 47, as a result of which since the magnitude of the load applied to the spindle bearing 47 and the direction of the load can be directly measured, the fatigue state of the spindle bearing 47 can be predicted. Further, as shown in FIG. 12 described in the above second embodiment, the multiple paired non-contact type displacement sensors 23a and 23b are disposed in the bearing housing configuring the spindle bearing 47 along the circumferential direction. As a result, since the magnitude of the load applied to the spindle bearing 47 and the direction of the load can be directly measured, the fatigue state of the spindle bearing 47 can be predicted as described in the second embodiment.

Also, as shown in FIG. 17 described in the above third embodiment, on the hub 42 side of the spindle 43, the multiple strain sensors 24 are disposed along the circumferential direction of the spindle 43 at the symmetric positions with respect to the axial center in the transverse section of the spindle 43. In addition, the multiple support units 26 whose spring constant is known are disposed on the mount 48 that supports the speed increaser 44 and the multiple displacement sensors 25 are disposed along the circumferential direction on the support units 26, to thereby measure the bending moment applied to the hub 42 and the displacement of the mount 48 in the circumferential direction. In that case, the wind load is first measured by measuring the bending strain of the blades 41. Next, the bending moment applied to the hub 42 is measured by the multiple strain sensors 24 according to a difference in the wind load applied to each of the blades 41. Then, the distribution of the circumferential displacement of the mount 48 supporting the speed increaser 44 is measured by the multiple displacement sensors 25. This makes it possible to measure the load applied to the main shat bearing 47

The arithmetic unit 10, the input unit 21, and the display unit 22 configuring the rolling bearing fatigue state prediction device 1 shown in FIG. 2 are installed, for example, at a central power supply command station located remotely from the wind power generator 40. Even if a direction of the load acting on the spindle bearing 47 changes, as described in the above first or third embodiment, the operator can easily confirm the fatigue state prediction result of the spindle bearing 47 through the display screen 30 of the display unit 22, thereby being capable of determining when to replace the spindle bearing 47. As a result, the availability factor of the wind power generator 40 can be improved.

In addition, the arithmetic unit 10a, the input unit 21, and the display unit 22 configuring the rolling bearing fatigue state prediction device 1a shown in FIG. 2 are installed, for example, at a central power supply command station located remotely from the wind power generator 40. Even if a direction of the load acting on the spindle bearing 47 changes, as described in the above second embodiment, the operator can easily confirm the fatigue state prediction result of the spindle bearing 47 through the display screen 30 of the display unit 22, thereby being capable of determining when to replace the spindle bearing 47. As a result, the availability factor of the wind power generator 40 can be improved.

In the present embodiment, the above-mentioned "degree of influence" also includes a power fee (cost) during a stoppage period by stopping the wind power generator 40 for replacing parts of the spindle bearing 47.

In the present embodiment, the wind power generator 40 is exemplified by a rotating machine in which the direction of the load acting on the rolling bearing is changed, but the present invention is not limited to the above configuration, but the present invention can be also applied to a rotating machine such as a construction machine. In the case of construction machinery, penalties due to extension of construction period due to suspension of construction machinery, and so on are included in the above "degree of influence".

As described above, according to the present embodiment, since the fatigue state of the rolling bearing can be predicted with high accuracy in a rotating machine in which the direction of the load applied to the rolling bearing changes, and the operator can easily confirm the fatigue state of the rolling bearing on the display screen, the replacement timing of the rolling bearing can be optimized, as a result of which the availability factor of the rotating machine can be improved.

The present invention is not limited to the embodiments described above, but includes various modifications. For example, the above-described embodiments have been described in detail in order to describe the present invention in an easy-to-understand manner, and are not necessarily limited to those having all the configurations described. Also, one of the configurations of one embodiment can be replaced by the configuration of another embodiment, and the configuration of another embodiment can be applied to the configuration of one embodiment.

LIST OF REFERENCE SIGNS 1, 1a . . . rolling bearing fatigue state prediction device; 2 . . . rolling bearing; 3 . . . rotating shaft; 4 . . . inner ring; 5 . . . outer ring; 6 . . . rolling body; 7 . . . bearing housing; 8a to 8h . . . load sensor; 9 . . . concave portion; 10, 10a . . . arithmetic unit; 11 . . . input I/F; 12 . . . measured value acquisition unit; 13 . . . load addition region identification unit, 14 . . . fatigue state prediction unit; 15 . . . storage unit; 16 . . . display control unit; 17 . . . output I/F; 18 . . . internal bus; 19 . . . stress-load database; 21 . . . input unit; 22 . . . display unit; 23a, 23b . . . non-contact type displacement sensor; 24 . . . strain sensor; 25 . . . displacement sensor; 26 . . . support unit; 27 . . . axis end region; 28 . . . $L_{nm}$ curve; 30 . . . display screen; 31 . . . first display area; 32 . . . second display area; 33 . . . execution button; 34 . . . maintenance button; 40 . . . wind power generator; 41 . . . blade; 42 . . . hub; 43 . . . spindle; 44 . . . speed increaser; 45 . . . generator shaft; 46 . . . power generator; 47 . . . spindle bearing; 48 . . . mount; 49 . . . nacelle; and 50 . . . tower

The invention claimed is:

1. A rolling bearing fatigue state prediction device, comprising:
 a load measurement unit that obtains a magnitude and a direction of a bearing load to be applied to a rolling bearing that supports a rotating body;

a load applied region identification unit that identifies a region to which the load is applied in a circumferential region of the rolling bearing; and a fatigue state prediction unit that predicts a fatigue state of the rolling bearing based on the obtained magnitude of the load and the identified load applied region;

wherein the load measurement unit includes:

a plurality of sensors that are spaced apart from each other at a predetermined interval along a circumferential direction of the rolling bearing; and a measured value acquisition unit that converts a measurement signal from each of the sensors into a digital signal and performs a smoothing process including noise removal to obtain a measured value;

wherein a plurality of divided regions are set in an inner ring and an outer ring configuring the rolling bearing along a circumferential direction in advance; and the load applied region identification unit identifies which of the plurality of divided regions set in the inner ring or the outer ring on a fixed side is subjected to the load based on the measured value from the measurement value acquisition unit, and sets the identified divided region as the load applied region;

wherein the fatigue state prediction unit obtains a load frequency distribution for each divided region set in the inner ring or the outer ring on the fixed side based on the measured value from the measured value acquisition unit, obtains a cumulative damage degree for each divided region set in the inner ring or the outer ring on the fixed side based on the obtained load frequency distribution, and obtains a damage probability of the rolling bearing based on the cumulative damage degree of the divided region where the obtained cumulative damage degree is the maximum.

2. The rolling bearing fatigue state prediction device according to claim 1, further comprising:

a display unit, and a display control unit that outputs, to the display unit, the magnitude and the direction of the bearing load obtained by the load measurement unit, the load applied region identified by the load applied region identification unit, and the damage probability of the rolling bearing obtained by the fatigue state prediction unit, or the magnitude and the direction of the bearing load obtained by the load measurement unit and the cumulative damage degree and the damage probability of the rolling bearing obtained by the fatigue state prediction unit.

3. The rolling bearing fatigue state prediction device according to claim 2, wherein a display screen of the display unit includes:

a first display area for displaying the magnitude and the direction of the bearing load obtained by the load measurement unit, the load applied region identified by the load applied region identification unit, and the damage probability of the rolling bearing obtained by the fatigue state prediction unit, or the magnitude and the direction of the bearing load obtained by the load measurement unit and the cumulative damage degree and the damage probability of the rolling bearing obtained by the fatigue state prediction unit; and a second display area for displaying a maintenance message.

4. The rolling bearing fatigue state prediction device according to claim 1, wherein the sensors are load sensors, and the sensors are disposed at positions facing central portions of the plurality of divided regions set in the outer ring along the circumferential direction on an inner circumferential surface side of a bearing housing disposed on a radially outer side of the outer ring on the fixed side, or at positions facing central portions of the plurality of divided regions set in the inner ring along the circumferential direction on an outer circumferential surface side of the rotating body disposed on a radially inner side of the inner ring on the fixed side.

5. The rolling bearing fatigue state prediction device according to claim 1, wherein the sensors are non-contact type displacement sensors, and the sensors are placed in a bearing housing disposed on a radially outer side of the outer ring without contacting a rolling element to sandwich the rolling element disposed between the inner ring and the outer ring configuring the rolling bearing in an axial direction of the rotating body, and spaced apart from each other at a predetermined interval along the circumferential direction of the bearing housing.

6. The rolling bearing fatigue state prediction device according to claim 1, wherein the sensors include:

a plurality of strain sensors that are disposed at one end side of the rotating body in the axial direction and spaced away from each other at a predetermined interval along the circumferential direction of the rotating body; and a plurality of displacement sensors that are provided on the other end side of the rotating body in the axial direction and attached to a support unit with a known spring constant, and the load applied region identification unit obtains a magnitude and a direction of a bearing load to be applied to the rolling bearing based on a moment of the rotating body measured by the plurality of strain sensors and a displacement of the rotating body measured by the plurality of displacement sensors.

7. A rolling bearing fatigue state prediction device, comprising:

a load measurement unit that obtains a magnitude and a direction of a bearing load to be applied to a rolling bearing that supports a rotating body;

a load applied region identification unit that identifies a region to which the load is applied in a circumferential region of the rolling bearing; and a fatigue state prediction unit that predicts a fatigue state of the rolling bearing based on the obtained magnitude of the load and the identified load applied region;

wherein the load measurement unit includes:

a plurality of sensors that are spaced apart from each other at a predetermined interval along a circumferential direction of the rolling bearing, and a measured value acquisition unit that converts a measurement signal from each of the sensors into a digital signal and performs a smoothing process including noise removal to obtain a measured value;

wherein a plurality of divided regions are set in an inner ring and an outer ring configuring the rolling bearing along a circumferential direction in advance; and the load applied region identification unit identifies which of the plurality of divided regions set in the inner ring or the outer ring on a fixed side is subjected to the load based on the measured value from the measurement value acquisition unit, and sets the identified divided region as the load applied region;

wherein the sensors include:

a plurality of strain sensors that are disposed at one end side of the rotating body in the axial direction and spaced away from each other at a predetermined interval along the circumferential direction of the rotating body; and a plurality of displacement sensors that are provided on the other end side of the rotating body in the axial direction and attached to a support unit with a known spring constant, and the load applied region identification unit obtains a magnitude and a direction of a bearing load to be applied to the rolling bearing based on a moment of the rotating body measured by the plurality of strain sensors and a displacement of the rotating body measured by the plurality of displacement sensors.

8. The rolling bearing fatigue state prediction device according to claim 7, wherein the sensors are load sensors, and the sensors are disposed at positions facing central portions of the plurality of divided regions set in the outer ring along the circumferential direction on an inner circumferential surface side of a bearing housing disposed on a radially outer side of the outer ring on the fixed side, or at positions facing central portions of the plurality of divided regions set in the inner ring along the circumferential direction on an outer circumferential surface side of the rotating body disposed on a radially inner side of the inner ring on the fixed side.

9. The rolling bearing fatigue state prediction device according to claim 7, wherein the sensors are non-contact type displacement sensors, and the sensors are placed in a bearing housing disposed on a radially outer side of the outer ring without contacting a rolling element to sandwich the rolling element disposed between the inner ring and the outer ring configuring the rolling bearing in an axial direction of the rotating body, and spaced apart from each other at a predetermined interval along the circumferential direction of the bearing housing.

10. A rolling bearing fatigue state prediction method for predicting a fatigue state of a rolling bearing which supports a rotating body, comprising:

obtaining a magnitude and a direction of a bearing load to be applied to the rolling bearing;

identifying a region to which the load is applied in a circumferential region of the rolling bearing based on the obtained magnitude and direction of the bearing load;

predicting a fatigue state of the rolling bearing based on the obtained magnitude of the load and the identified load applied region;

setting a plurality of divided regions on an inner ring and an outer ring configuring the rolling bearing along a circumferential direction in advance;

identifying which of the plurality of divided regions set in the inner ring or the outer ring on a fixed side is subjected to the load based on the obtained magnitude and direction of the bearing load, and setting the identified divided region as the load applied region;

obtaining a load frequency distribution for each divided region set in the inner ring or the outer ring on the fixed side based on the obtained magnitude and direction of the bearing load;

obtaining a cumulative damage degree for each divided region set in the inner ring or the outer ring on the fixed side based on the obtained load frequency distribution; and obtaining a damage probability of the rolling bearing based on the cumulative damage degree of the divided region where the obtained cumulative damage degree is the maximum.

11. The rolling bearing fatigue state prediction method according to claim 10, further comprising:

outputting the obtained magnitude and direction of the bearing load, the load applied region, and the obtained damage probability of the rolling bearing to the display unit.

12. The rolling bearing fatigue state prediction method according to claim 10, further comprising:

outputting the obtained magnitude and direction of the bearing load, the obtained cumulative damage degree, and the damage probability of the rolling bearing to the display unit.

13. The rolling bearing fatigue state prediction method according to claim 11, further comprising:

displaying, in a first display area configuring a display screen of the display unit, the obtained magnitude and direction of the bearing load, the load applied region, and the obtained damage probability of the rolling bearing, or the obtained magnitude and direction of the bearing load, and the obtained cumulative damage degree and the obtained damage probability of the rolling bearing; and displaying a maintenance message in a second display area configuring the display screen of the display unit.

14. The rolling bearing fatigue state prediction method according to claim 12, further comprising:

displaying, in a first display area configuring a display screen of the display unit, the obtained magnitude and direction of the bearing load, the load applied region, and the obtained damage probability of the rolling bearing, or the obtained magnitude and direction of the bearing load, and the obtained cumulative damage degree and the obtained damage probability of the rolling bearing; and displaying a maintenance message in a second display area configuring the display screen of the display unit.

* * * * *